United States Patent
Kawahara et al.

(10) Patent No.: US 12,441,878 B2
(45) Date of Patent: Oct. 14, 2025

(54) THERMOPLASTIC ELASTOMER COMPOSITION, LAMINATE STRUCTURE AND METHOD FOR PRODUCING SAID LAMINATE STRUCTURE

(71) Applicant: KURARAY CO., LTD., Okayama (JP)

(72) Inventors: Moe Kawahara, Ibaraki (JP); Makoto Akai, Ibaraki (JP); Daisuke Konishi, Ibaraki (JP); Hiromitsu Sasaki, Ibaraki (JP)

(73) Assignee: KURARAY CO., LTD., Okayama (JP)

( * ) Notice: Subject to any disclaimer, the term of this patent is extended or adjusted under 35 U.S.C. 154(b) by 378 days.

(21) Appl. No.: 17/919,816

(22) PCT Filed: Apr. 8, 2021

(86) PCT No.: PCT/JP2021/014852
§ 371 (c)(1),
(2) Date: Oct. 19, 2022

(87) PCT Pub. No.: WO2021/215255
PCT Pub. Date: Oct. 28, 2021

(65) Prior Publication Data
US 2023/0235162 A1 Jul. 27, 2023

(30) Foreign Application Priority Data
Apr. 20, 2020 (JP) ................................ 2020-074825

(51) Int. Cl.
*C08L 53/02* (2006.01)
*B32B 27/08* (2006.01)
*B32B 27/18* (2006.01)
*B32B 27/30* (2006.01)
*B32B 27/36* (2006.01)

(52) U.S. Cl.
CPC .............. *C08L 53/02* (2013.01); *B32B 27/18* (2013.01); *B32B 27/308* (2013.01); *B32B 27/08* (2013.01); *B32B 27/302* (2013.01); *B32B 27/36* (2013.01); *B32B 27/365* (2013.01); *B32B 2250/24* (2013.01); *B32B 2274/00* (2013.01); *B32B 2307/536* (2013.01); *B32B 2307/54* (2013.01)

(58) Field of Classification Search
CPC ....... C08L 53/02; B32B 27/18; B32B 27/308; B32B 27/08; B32B 27/302; B32B 27/36; B32B 27/365; B32B 2250/24; B32B 2274/00; B32B 2307/536; B32B 2307/54
See application file for complete search history.

(56) References Cited

U.S. PATENT DOCUMENTS

| | | | |
|---|---|---|---|
| 7,772,319 B2 | 8/2010 | Fujihara et al. | |
| 10,072,186 B2 | 9/2018 | Nelson et al. | |
| 10,329,462 B2 | 6/2019 | Nelson et al. | |
| 2005/0085592 A1* | 4/2005 | Taniguchi | C08F 293/005 525/242 |
| 2009/0105396 A1* | 4/2009 | Fujihara | C08L 53/00 524/505 |
| 2010/0119797 A1* | 5/2010 | Oshima | C08L 53/00 428/480 |
| 2015/0284656 A1 | 10/2015 | Uehara et al. | |
| 2017/0029668 A1 | 2/2017 | Nelson et al. | |
| 2018/0134890 A1 | 5/2018 | Tanaka et al. | |
| 2018/0340103 A1 | 11/2018 | Nelson et al. | |

FOREIGN PATENT DOCUMENTS

| | | |
|---|---|---|
| JP | H11-302495 A | 11/1999 |
| JP | 2003-041089 A | 2/2003 |
| JP | 2003-089778 A | 3/2003 |
| JP | 2004-346109 A | 12/2004 |
| JP | 5671658 B1 | 2/2015 |
| JP | 2017-039820 A | 2/2017 |
| JP | 2018-528297 A | 9/2018 |
| JP | 2019-011471 A | 1/2019 |
| JP | 2019-085455 A | 6/2019 |
| JP | 2020-139156 A | 9/2020 |
| KR | 10-2008-0048495 A | 6/2008 |
| TW | 201529691 A | 8/2015 |
| WO | 2015/087953 A1 | 6/2015 |

OTHER PUBLICATIONS

ISR issued in INTERNATIONAL Patent Application No. PCT/JP2021/014852, Jun. 29, 2021, English translation.
IPRP/WO issued in INTERNATIONAL Patent Application No. PCT/JP2021/014852, Oct. 25, 2022, English translation.

* cited by examiner

*Primary Examiner* — Catherine S Branch
*Assistant Examiner* — Andrea Wu
(74) *Attorney, Agent, or Firm* — GREENBLUM & BERNSTEIN, P.L.C.

(57) ABSTRACT

A thermoplastic elastomer composition including an acrylic block copolymer (I) and a hydrogenated block copolymer (II). The content of the acrylic block copolymer (I) is 70 to 300 parts by mass with respect to 100 parts by mass of the hydrogenated block copolymer (II); the hydrogenated block copolymer (II) is a hydrogenated product of a block copolymer (P) including a polymer block (A1) containing structural units derived from an aromatic vinyl compound, and a polymer block (B1) containing 1 to 100 mass % of structural units (b1) derived from farnesene and 99 to 0 mass % of structural units (b2) derived from a conjugated diene other than farnesene, the mass ratio [(A1)/(B1)] of the polymer block (A1) to the polymer block (B1) being 1/99 to 70/30; and the hydrogenation ratio of carbon-carbon double bonds in the polymer block (B1) is 50 to 100 mol %.

16 Claims, No Drawings

THERMOPLASTIC ELASTOMER COMPOSITION, LAMINATE STRUCTURE AND METHOD FOR PRODUCING SAID LAMINATE STRUCTURE

TECHNICAL FIELD

The present invention relates to a thermoplastic elastomer composition, a laminate structure, and a method for producing the laminate structure.

BACKGROUND ART

Ceramics, metals and synthetic resins are excellent in durability, heat resistance and mechanical strength, and are widely used in various applications such as home appliances, electronic parts, mechanical parts and automobile parts. Depending on, for example, use applications, structures of parts, and manners of use, these parts are sometimes fixed to other structural members with highly flexible elastomer members as adhesives, or are often formed into complexes with highly flexible elastomer members for purposes such as impact absorption, damage prevention and sealing.

Such elastomer members that may be suitably used are styrene-based thermoplastic elastomers having excellent flexibility, tensile characteristics and shaping processability. Here, the styrene-based thermoplastic elastomers are block copolymers that include a polymer block containing structural units derived from an aromatic vinyl compound, and a polymer block containing structural units derived from a conjugated diene.

The styrene-based thermoplastic elastomers are materials having low polarity and are unfortunately incapable of offering sufficient bond strength with respect to highly polar materials such as, for example, highly polar synthetic resins, ceramics and metals.

One of the approaches suggested to solve this problem is a composition obtained by adding, for example, a highly polar tackifier resin to an aromatic vinyl-conjugated diene block copolymer (see, for example, Patent Literature 1).

Furthermore, thermoplastic resin compositions are suggested that include an aromatic vinyl compound-conjugated diene block copolymer or a hydrogenated product thereof, a thermoplastic elastomer, and further a polyurethane-based block copolymer containing a specific addition-polymerized polymer block and a polyurethane block composed of a polyurethane elastomer (Patent Literatures 2 to 4).

CITATION LIST

Patent Literature

Patent Literature 1: JP-A-2003-089778
Patent Literature 2: JP-A-H11-302495
Patent Literature 3: JP-A-2003-041089
Patent Literature 4: JP-A-2004-346109

SUMMARY OF INVENTION

Technical Problem

The approach of Patent Literature 1 tends to offer improved adhesion with respect to highly polar materials, but the tackifier resin contained in the composition sometimes causes contamination of materials.

The approaches disclosed in Patent Literatures 2 to 4 improve the adhesion but are encountered with insufficient flexibility, tensile characteristics, shaping processability, heat resistance, weather resistance and water resistance.

The present invention has been made in view of the circumstances discussed above. It is therefore an object of the present invention to provide a thermoplastic elastomer composition that can be adjusted to a wide range of hardness, has excellent tensile characteristics and shaping processability, and exhibits excellent bond strength even with respect to highly polar materials, and to provide a related laminate structure and a method for producing the laminate structure.

Solution to Problem

A gist of the present invention resides in the following [1] to [17].

[1] A thermoplastic elastomer composition comprising an acrylic block copolymer (I) and a hydrogenated block copolymer (II), wherein
the content of the acrylic block copolymer (I) is 70 to 300 parts by mass with respect to 100 parts by mass of the hydrogenated block copolymer (II),
the hydrogenated block copolymer (II) is a hydrogenated product of a block copolymer (P) including a polymer block (A1) containing structural units derived from an aromatic vinyl compound, and a polymer block (B1) containing 1 to 100 mass % of structural units (b1) derived from farnesene and 99 to 0 mass % of structural units (b2) derived from a conjugated diene other than farnesene, the mass ratio [(A1)/(B1)] of the polymer block (A1) to the polymer block (B1) being 1/99 to 70/30, and
the hydrogenation ratio of carbon-carbon double bonds in the polymer block (B1) is 50 to 100 mol %.

[2] The thermoplastic elastomer composition described in [1], wherein the acrylic block copolymer (I) includes a polymer block (D1) containing structural units derived from an acrylic acid ester, and a polymer block (E1) containing structural units derived from a methacrylic acid ester, and
the acrylic block copolymer (I) is a triblock copolymer having blocks in the order of the polymer block (E1), the polymer block (D1) and the polymer block (E1).

[3] The thermoplastic elastomer composition described in [1] or [2], wherein the molecular weight distribution of the acrylic block copolymer (I) is in the range of 1.00 to 1.40.

[4] The thermoplastic elastomer composition described in any of [1] to [3], further comprising 1 to 200 parts by mass of a softener (IV) with respect to 100 parts by mass of the hydrogenated block copolymer (II).

[5] The thermoplastic elastomer composition described in any of [1] to [4], wherein the hydrogenation ratio of carbon-carbon double bonds in the polymer block (B1) is 70 to 100 mol %.

[6] The thermoplastic elastomer composition described in any of [1] to [5], wherein the aromatic vinyl compound is at least one selected from the group consisting of styrene, α-methylstyrene and 4-methylstyrene.

[7] The thermoplastic elastomer composition described in any of [1] to [6], wherein the farnesene is β-farnesene.

[8] The thermoplastic elastomer composition described in any of [1] to [7], wherein the conjugated diene other than farnesene is at least one selected from the group consisting of isoprene, butadiene and myrcene.

[9] The thermoplastic elastomer composition described in any of [1] to [8], wherein the acrylic block copolymer (I) has a peak-top molecular weight (Mp) in the range of 50,000 to 250,000 as measured by gel permeation chromatography relative to standard polystyrene.

[10] The thermoplastic elastomer composition described in any of [1] to [9], wherein the hydrogenated block copolymer (II) has a peak-top molecular weight (Mp) of 4,000 to 1,500,000 as measured by gel permeation chromatography relative to standard polystyrene.

[11] The thermoplastic elastomer composition described in any of [1] to [10], wherein the hydrogenated block copolymer (II) is a hydrogenated product of a triblock copolymer having blocks in the order of the polymer block (A1), the polymer block (B1) and the polymer block (A1).

[12] The thermoplastic elastomer composition described in any of [1] to [11], wherein the hydrogenated block copolymer (II) is a hydrogenated product of a block copolymer (P) including the polymer blocks (A1), the polymer block (B1) and a polymer block (C1), the polymer block (C1) is a polymer block containing less than 1 mass % of structural units (c1) derived from farnesene, and 1 to 100 mass % of structural units (c2) derived from a conjugated diene other than farnesene, the mass ratio [(A1)/((B1)+(C1))] of the polymer blocks (A1) to the total of the polymer block (B1) and the polymer block (C1) is 1/99 to 70/30, and the block copolymer (P) includes at least two polymer blocks (A1), at least one polymer block (B1) and at least one polymer block (C1) in such a manner that at least one polymer block (B1) is located at a terminal, and the hydrogenation ratio of carbon-carbon double bonds in the polymer block (B1) and the polymer block (C1) is 50 to 100 mol %.

[13] The thermoplastic elastomer composition described in any of [1] to [12], further comprising 1 to 200 parts by mass of a polar group-containing polymer (III) with respect to 100 parts by mass of the hydrogenated block copolymer (II).

[14] The thermoplastic elastomer composition described in [13], wherein the polar group-containing polymer (III) is a hydrophilic group-containing block copolymer having a structure in which polyolefin blocks and hydrophilic polymer blocks are bonded to one another alternately.

[15] A laminate structure comprising a layer formed of the thermoplastic elastomer composition described in any of [1] to [14], and a layer formed of a further material other than the thermoplastic elastomer composition.

[16] The laminate structure described in [15], wherein the further material is at least one selected from the group consisting of synthetic resins, metals and ceramics.

[17] A method for producing a laminate structure, the method comprising thermally laminating a layer formed of the thermoplastic elastomer composition described in any of [1] to [14] onto a layer formed of a further material other than the thermoplastic elastomer composition.

Advantageous Effects of Invention

The thermoplastic elastomer composition according to the present invention can be adjusted to a wide range of hardness, has excellent tensile characteristics and shaping processability, and exhibits excellent bond strength even with respect to highly polar materials. The present invention also provides a related laminate structure, and a method for producing the laminate structure.

DESCRIPTION OF EMBODIMENTS

In the present specification, "(meth)acrylic acid ester" means "methacrylic acid ester" or "acrylic acid ester"; "(meth)acrylic" means "methacrylic" or "acrylic"; and "(meth)acryloyl" means "acryloyl" or "methacryloyl".

[Thermoplastic Elastomer Compositions]

A thermoplastic elastomer composition of the present invention includes an acrylic block copolymer (I) and a hydrogenated block copolymer (II). In the thermoplastic elastomer composition, the content of the acrylic block copolymer (I) is 70 to 300 parts by mass with respect to 100 parts by mass of the hydrogenated block copolymer (II); the hydrogenated block copolymer (II) is a hydrogenated product of a block copolymer (P) including a polymer block (A1) containing structural units derived from an aromatic vinyl compound, and a polymer block (B1) containing 1 to 100 mass % of structural units (b1) derived from farnesene and 99 to 0 mass % of structural units (b2) derived from a conjugated diene other than farnesene, the mass ratio [(A1)/(B1)] of the polymer block (A1) to the polymer block (B1) being 1/99 to 70/30; and the hydrogenation ratio of carbon-carbon double bonds in the polymer block (B1) is 50 to 100 mol %.

<Acrylic Block Copolymers (I)>

The acrylic block copolymer (I) described hereinabove (hereinafter, also written simply as the "acrylic block copolymer (I)") is a copolymer that has a plurality of polymer blocks containing structural units derived from a (meth) acrylic acid ester. From the points of view of flexibility, weather resistance and bond strength, a preferred acrylic block copolymer (I) is an acrylic block copolymer (I-1) that includes a polymer block (D1) containing structural units derived from an acrylic acid ester, and a polymer block (E1) containing structural units derived from a methacrylic acid ester.

[Polymer Blocks (D1)]

The polymer block (D1) contains structural units derived from an acrylic acid ester. Here, the acrylic acid esters are roughly classified into acrylic acid esters represented by the general formula $CH_2=CH—COOR^1$ (X) (in the formula (X), $R^1$ denotes a C4-C6 organic group) (hereinafter, such acrylic acid esters will be written as the acrylic acid esters (d-1)), acrylic acid esters represented by the general formula $CH_2=CH—COOR^2$ (Y) (in the formula (Y), $R^2$ denotes a C7-C12 organic group) (hereinafter, such acrylic acid esters will be written as the acrylic acid esters (d-2)), and acrylic acid esters other than those described above.

Examples of the C4-C6 organic groups represented by $R^1$ include C4-C6 alkyl groups such as butyl group, amyl group (pentyl group), hexyl group and cyclohexyl group; C6 aromatic ring groups such as phenyl group; and organic groups containing an element other than carbon, for example, oxygen, and having a total number of carbon atoms of 4 to 6, such as ethoxyethyl group, tetrahydrofurfuryl group and diethylaminoethyl group. Examples of such acrylic acid esters (d-1) include acrylic acid esters having no functional groups, such as n-butyl acrylate, isobutyl acrylate, sec-butyl acrylate, tert-butyl acrylate, amyl acrylate, isoamyl acrylate, n-hexyl acrylate, cyclohexyl acrylate and phenyl acrylate; and acrylic acid esters having a functional group, such as ethoxyethyl acrylate, tetrahydrofurfuryl acrylate and diethylaminoethyl acrylate.

Examples of the C7-C12 organic groups represented by $R^2$ include C7-C12 alkyl groups such as ethylhexyl group, octyl group, decyl group, isobornyl group and lauryl group; C7-C12 aromatic ring groups such as benzyl group; and organic groups containing an element other than carbon, for example, oxygen, and having a total number of carbon atoms of 7 to 12, such as phenoxyethyl group. Examples of such acrylic acid esters (d-2) include acrylic acid esters having no functional groups, such as 2-ethylhexyl acrylate, n-octyl acrylate, isooctyl acrylate, decyl acrylate, isobornyl acrylate, lauryl acrylate and benzyl acrylate; and acrylic acid esters having a functional group, such as phenoxyethyl acrylate.

Examples of the acrylic acid esters other than the acrylic acid esters (d-1) and the acrylic acid esters (d-2) include acrylic acid esters having no functional groups, such as methyl acrylate, ethyl acrylate, isopropyl acrylate, n-propyl acrylate and octadecyl acrylate; and acrylic acid esters having a functional group, such as methoxyethyl acrylate, 2-hydroxyethyl acrylate, 2-aminoethyl acrylate and glycidyl acrylate.

Among the acrylic acid esters (d-1), acrylic acid esters having no functional groups are preferable from the point of view of the flexibility of the thermoplastic elastomer composition that is obtained, and n-butyl acrylate is more preferable.

The proportion [(d-1)/(D1)] of the acrylic acid ester (d-1) in the polymer block (D1) is preferably 10 to 100 mass %, more preferably 30 to 100 mass %, and still more preferably 50 to 100 mass %. The proportion of the acrylic acid ester (d-1) in the polymer block (D1) may be 100 mass %. The above range ensures that the thermoplastic elastomer composition of the present invention will exhibit good shaping processability. The contents of the acrylic acid ester (d-1) and of the polymer block (D1) may be determined by $^1$H-NMR, specifically, by the method described in Examples.

Among the acrylic acid esters (d-2), acrylic acid esters having no functional groups are preferable for the reason that the phase separation between the polymer block (D1) and the polymer block (E1) becomes clearer and consequently the thermoplastic elastomer composition exhibits a high cohesion force. From the above viewpoint, 2-ethylhexyl acrylate, n-octyl acrylate, isooctyl acrylate and benzyl acrylate are more preferable. Furthermore, 2-ethylhexyl acrylate is more preferable for the reason that the thermoplastic elastomer composition that is obtained exhibits stable durability in a wide temperature range.

The acrylic acid esters described above may be used singly, or two or more may be used in combination. The content of the structural units derived from the acrylic acid ester in the polymer block (D1) is preferably 60 mass % or more, more preferably 80 mass % or more, and still more preferably 90 mass % or more, and may be 100 mass %.

Among those described above, the acrylic acid ester is preferably at least one selected from the acrylic acid esters (d-1) and the acrylic acid esters (d-2) for the reason that the acrylic block copolymer (I-1) attains enhanced compatibility with the hydrogenated block copolymer (II) and consequently the composition exhibits stable adhesion and shaping processability.

The polymer block (D1) includes structural units derived from an acrylic acid ester. In a preferred embodiment, this acrylic acid ester comprises a combination of at least one selected from the acrylic acid esters (d-1) and at least one selected from the acrylic acid esters (d-2). In this case, the mass ratio (d-1)/(d-2) of the structural units derived from the acrylic acid ester(s) (d-1) to the structural units derived from the acrylic acid ester(s) (d-2) is preferably 90/10 to 10/90, and more preferably 60/40 to 40/60.

When (d-1)/(d-2) is in the above range, the acrylic block copolymer (I-1) attains enhanced compatibility with the hydrogenated block copolymer (II) and consequently the composition exhibits stable adhesion and shaping processability. The mass ratio of the acrylic acid ester(s) (d-1) to the acrylic acid ester(s) (d-2) may be determined by $^1$H-NMR measurement.

Examples of the combinations of the acrylic acid ester (d-1) and the acrylic acid ester (d-2) used in the polymer block (D1) include n-butyl acrylate/2-ethylhexyl acrylate. The acrylic acid ester (d-1) and the acrylic acid ester (d-2) that are used in combination are more preferably such that the difference in solubility parameter between the acrylic acid ester (d-1) and the acrylic acid ester (d-2) is 0.3 to 2.5 $(MPa)^{1/2}$. The solubility parameters may be calculated by the methods described in "POLYMER HANDBOOK Fourth Edition", VII, pp. 675-714 (Wiley Interscience, 1999) and "Polymer Engineering and Science", 1974, vol. 14, pp. 147-154. When the acrylic block copolymer (I-1) includes two or more polymer blocks (D1), the combinations of the acrylic acid esters in the polymer blocks (D1) may be the same as or different from one another.

When the polymer block (D1) is a copolymer that includes both acrylic acid ester (d-1) units and acrylic acid ester (d-2) units, the copolymer may be a random copolymer, a block copolymer or a gradient copolymer of the acrylic acid ester (d-1) and the acrylic acid ester (d-2), and it is usually desirable that the copolymer be a random copolymer of such acrylic acid esters. When the acrylic block copolymer (I-1) includes two or more polymer blocks (D1), the structures of the polymer blocks (D1) may be the same as or different from one another. The proportion of the total of the units from the acrylic acid esters (d-1) and (d-2) in the polymer block (D1) is preferably 60 mass % or more, more preferably 80 mass % or more, and still more preferably 90 mass % or more of the polymer block (D1), and may be 100 mass %.

The glass transition temperature of the polymer block (D1) is preferably −100 to 30° C., more preferably −80 to 10° C., still more preferably −70 to 0° C., and most preferably −60 to −10° C. When the glass transition temperature is in this range, the thermoplastic elastomer composition of the present invention can exhibit excellent adhesion at room temperature.

[Polymer Blocks (E1)]

The polymer block (E1) includes structural units derived from a methacrylic acid ester. Examples of the methacrylic acid esters include methacrylic acid esters having no functional groups, such as methyl methacrylate, ethyl methacrylate, isopropyl methacrylate, n-propyl methacrylate, n-butyl methacrylate, isobutyl methacrylate, sec-butyl methacrylate, tert-butyl methacrylate, n-hexyl methacrylate, cyclohexyl methacrylate, 2-ethylhexyl methacrylate, n-octyl methacrylate, lauryl methacrylate, tridecyl methacrylate, stearyl methacrylate, isobornyl methacrylate, phenyl methacrylate and benzyl methacrylate; and methacrylic acid esters having a functional group, such as methoxyethyl methacrylate, ethoxyethyl methacrylate, diethylaminoethyl methacrylate, 2-hydroxyethyl methacrylate, 2-aminoethyl methacrylate, glycidyl methacrylate and tetrahydrofurfuryl methacrylate.

Among those described above, methacrylic acid esters having no functional groups are preferable for the reason that the thermoplastic elastomer composition that is obtained attains enhancements in heat resistance and durability.

Methyl methacrylate, ethyl methacrylate, tert-butyl methacrylate, cyclohexyl methacrylate, 2-ethylhexyl methacrylate, isobornyl methacrylate, phenyl methacrylate and benzyl methacrylate are more preferable. Methyl methacrylate is more preferable for the reason that the phase separation between the polymer block (D1) and the polymer block (E1) becomes clearer and consequently the thermoplastic elastomer composition attains good mechanical properties. The polymer block (E1) may be composed of a single kind, or two or more kinds of the methacrylic acid esters described above. To improve the adhesion durability, the acrylic block copolymer (I-1) preferably has two or more polymer blocks (E1). In this case, the polymer blocks (E1) may be the same as or different from one another.

The peak-top molecular weight (Mp) of the polymer block (E1) is not particularly limited, but is preferably in the range of 1,000 to 50,000, and more preferably in the range of 2,000 to 30,000. If the Mp of the polymer block (E1) is below the above range, the acrylic block copolymer (I-1) that is obtained may have an insufficient cohesion force. If the Mp of the polymer block (E1) is higher than the above range, the acrylic block copolymer (I-1) that is obtained has such a high melt viscosity that the productivity may be deteriorated at the time of production of the thermoplastic elastomer composition. The peak-top molecular weight (Mp) is the molecular weight at the apex of the peak in the differential molecular weight distribution curve obtained by GPC measurement.

The content of the structural units derived from the methacrylic acid ester in the polymer block (E1) is preferably 60 mass % or more, more preferably 80 mass % or more, and still more preferably 90 mass % or more, and may be 100 mass %.

The glass transition temperature of the polymer block (E1) is preferably 80 to 140° C., more preferably 90 to 130° C., and still more preferably 100 to 120° C. When the glass transition temperature is in this range, the polymer block (E1) acts as physical pseudo-crosslinking sites at a usual service temperature of the thermoplastic elastomer composition to offer excellent adhesion, durability and heat resistance.

The polymer block (D1) may contain structural units derived from a methacrylic acid ester as long as the advantageous effects of the present invention are not impaired, and the polymer block (E1) may contain structural units derived from an acrylic acid ester as long as the advantageous effects of the present invention are not impaired. Where necessary, these polymer blocks may contain structural units derived from an additional monomer other than the (meth)acrylic acid esters. Examples of the additional monomers include vinyl monomers having a carboxyl group, such as (meth)acrylic acid, crotonic acid, maleic acid and fumaric acid; aromatic vinyl monomers such as styrene, α-methylstyrene, p-methylstyrene and m-methylstyrene; conjugated diene monomers such as butadiene and isoprene; olefin monomers such as ethylene, propylene, isobutene and octene; lactone monomers such as ε-caprolactone and valerolactone; (meth)acrylamide, (meth)acrylonitrile, maleic anhydride, vinyl acetate, vinyl chloride and vinylidene chloride. When these monomers are used, the amount is preferably 40 mass % or less, more preferably 20 mass % or less, and still more preferably 10 mass % or less relative to the total mass of the monomers used in each polymer block.

Where necessary, the acrylic block copolymer (I-1) used in the present invention may include an additional polymer block in addition to the polymer block (D1) and the polymer block (E1). Examples of such additional polymer blocks include polymer or copolymer blocks that contain structural units derived from such a monomer as styrene, α-methylstyrene, p-methylstyrene, m-methylstyrene, acrylonitrile, methacrylonitrile, ethylene, propylene, isobutene, butadiene, isoprene, octene, vinyl acetate, maleic anhydride, vinyl chloride or vinylidene chloride; and polymer blocks composed of polyethylene terephthalate, polylactic acid, polyurethane or polydimethylsiloxane. Examples of the polymer blocks further include hydrogenated products of polymer blocks that contain structural units derived from a conjugated diene compound such as butadiene or isoprene.

The acrylic block copolymer (I-1) is preferably represented by any of the general formulas below in which D1 denotes a polymer block (D1), D1' denotes a polymer block (D1) that has a different structure from the above polymer block (D1) (but is not a polymer block (E1)), and E1 denotes a polymer block (E1):

(E1-D1)$_n$
(E1-D1)$_n$-E1
D1-(E1-D1)$_n$
(E1-D1)$_n$-D1'
(E1-D1)$_n$-Z
(D1-E1)$_n$-Z

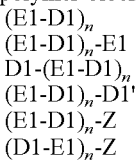

(In the formulas, n is an integer of 1 to 30, Z is a coupling site (a coupling site resulting from the formation of a chemical bond by the reaction of the chain end with a coupling agent), and - indicates a bond between the polymer blocks. When the formula includes a plurality of polymer blocks D1 and a plurality of polymer blocks E1, the polymer blocks may have the same structures or different structures.) Here, the term "different structures" means that the structures differ from one another in at least one of the types of monomer units forming the polymer blocks, the molecular weights, the molecular weight distributions, the stereoregularities, and, when the polymer blocks each have a plurality of types of monomer units, the ratios of the monomer units and the types of copolymerization (random, gradient or block). The value of n is preferably 1 to 15, more preferably 1 to 8, and still more preferably 1 to 4. Among the above structures, a linear block copolymer represented by (E1-D1)$_n$, (E1-D1)$_n$-E1, D1-(E1-D1)$_n$ or (E1-D1)$_n$-D1' is preferable for the reason that the thermoplastic elastomer composition attains excellent durability. A diblock copolymer represented by E1-D1, a triblock copolymer represented by the formula: E1-D1-D1', and a triblock copolymer having blocks in the order of the polymer block (E1), the polymer block (D1) and the polymer block (E1), namely, represented by the formula: E1-D1-E1 are more preferable. A triblock copolymer represented by the formula: E1-D1-E1 is still more preferable.

The peak-top molecular weight (Mp) of the acrylic block copolymer (I) is preferably 50,000 to 250,000. In particular, the Mp is more preferably 60,000 to 230,000 to ensure that the thermoplastic elastomer composition obtained in the present invention exhibits good fluidity, and is still more preferably 65,000 to 220,000, further preferably 70,000 to 200,000, and particularly preferably 70,000 to 100,000.

The molecular weight distribution (Mw/Mn) of the acrylic block copolymer (I) is preferably 1.00 to 1.40. To ensure that the thermoplastic elastomer composition that is obtained attains excellent durability, the Mw/Mn is more preferably 1.00 to 1.35, still more preferably 1.00 to 1.30, further preferably 1.00 to 1.25, and particularly preferably 1.00 to 1.20.

The peak-top molecular weight (Mp), the number average molecular weight (Mn) and the weight average molecular weight (Mw) of the acrylic block copolymer (I) are values determined by gel permeation chromatography relative to standard polystyrene, and the molecular weight distribution (Mw/Mn) is a value calculated from the values of Mw and Mn.

The ratio [(E1)/(D1)] of the content of the polymer block (E1) to the content of the polymer block (D1) in the acrylic block copolymer (I-1) is preferably 10/90 to 55/45, more preferably 15/85 to 55/45, still more preferably 20/80 to 53/47, and particularly preferably 25/75 to 52/48. The contents of the polymer block (E1) and of the polymer block (D1) may be determined by 1H-NMR, specifically, by the method described in Examples.

[Methods for Producing the Acrylic Block Copolymer (I)]

The acrylic block copolymer (I) may be produced by any method without limitation in accordance with a known technique as long as the polymer that is obtained satisfies the conditions described hereinabove. In general, a block copolymer with a narrow molecular weight distribution is obtained by the living polymerization of monomers that will form constituent units. Examples of the living polymerization processes include living polymerization using an organic rare earth metal complex as a polymerization initiator (see JP-A-H06-93060), living anionic polymerization performed with an organic alkali metal compound as a polymerization initiator in the presence of a mineral acid salt such as an alkali metal or alkaline earth metal salt (see JP-A-H05-507737), living anionic polymerization performed with an organic alkali metal compound as a polymerization initiator in the presence of an organoaluminum compound (see JP-A-H11-335432), and atom transfer radical polymerization (ATRP) (see Macromolecular Chemistry and Physics, 2000, vol. 201, pp. 1108-1114).

Among these production processes, living anionic polymerization performed with an organic alkali metal compound as a polymerization initiator in the presence of an organoaluminum compound is advantageous in that the obtainable block copolymer has high transparency and is less odorous because of little residual monomers, and also in that few bubbles are generated during shaping of the thermoplastic elastomer composition. Another advantage is that the methacrylic acid ester polymer block has a highly syndiotactic molecular structure and the heat resistance of the thermoplastic elastomer composition is effectively increased.

<Hydrogenated Block Copolymers (II)>

The hydrogenated block copolymer (II) described hereinabove (hereinafter, also written simply as the "hydrogenated block copolymer (II)") is a hydrogenated product of a block copolymer (P) that includes a polymer block (A1) containing structural units derived from an aromatic vinyl compound (hereinafter, this polymer block will be also written simply as the "polymer block (A1)"), and a polymer block (B1) containing 1 to 100 mass % of structural units (b1) derived from farnesene and 99 to 0 mass % of structural units (b2) derived from a conjugated diene other than farnesene (hereinafter, this polymer block will be also written simply as the "polymer block (B1)"), the mass ratio [(A1)/(B1)] of the polymer block (A1) to the polymer block (B1) being 1/99 to 70/30 (hereinafter, this block copolymer will be also written simply as the "block copolymer (P)"), and the hydrogenation ratio of carbon-carbon double bonds in the polymer block (B1) is 50 to 100 mol %.

[Polymer Blocks (A1)]

The polymer block (A1) contains structural units derived from an aromatic vinyl compound. Examples of the aromatic vinyl compounds include styrene, α-methylstyrene, 2-methylstyrene, 3-methylstyrene, 4-methylstyrene, 4-propylstyrene, 4-t-butylstyrene, 4-cyclohexylstyrene, 4-dodecylstyrene, 2,4-dimethylstyrene, 2,4-diisopropylstyrene, 2,4,6-trimethylstyrene, 2-ethyl-4-benzylstyrene, 4-(phenylbutyl)styrene, 1-vinylnaphthalene, 2-vinylnaphthalene, vinylanthracene, N,N-diethyl-4-aminoethylstyrene, vinylpyridine, 4-methoxystyrene, monochlorostyrene, dichlorostyrene and divinylbenzene. The aromatic vinyl compounds may be used singly, or two or more may be used in combination. Among those described above, styrene, α-methylstyrene and 4-methylstyrene are preferable, and styrene is more preferable.

The polymer block (A1) may contain structural units derived from an additional monomer other than aromatic vinyl compounds, for example, structural units derived from a monomer for forming the polymer block (B1) described later. The content of the structural units derived from the aromatic vinyl compound in the polymer block (A1) is preferably 60 mass % or more, more preferably 70 mass % or more, still more preferably 80 mass % or more, further preferably 90 mass % or more, and particularly preferably 100 mass %.

[Polymer Blocks (B1)]

The polymer block (B1) contains structural units (b1) derived from farnesene (hereinafter, also written simply as the "structural units (b1)"). The farnesene may be α-farnesene or may be β-farnesene represented by the formula (2) below, with β-farnesene being preferable from the point of view of easy production of the block copolymer (P). Incidentally, α-farnesene and β-farnesene may be used in combination.

[Chem. 1]

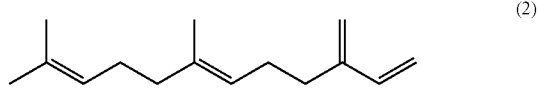

(2)

The content of the structural units (b1) derived from farnesene in the polymer block (B1) is 1 to 100 mass %. If the content of the structural units (b1) derived from farnesene is less than 1 mass %, flexibility and shaping processability are lowered, and the thermoplastic elastomer composition that is obtained fails to attain a high bond strength with respect to highly polar materials. From this point of view, the content of the structural units (b1) derived from farnesene in the polymer block (B1) is preferably 10 to 100 mass %, more preferably 20 to 100 mass %, still more preferably 30 to 100 mass %, further preferably 50 to 100 mass %, and particularly preferably 70 to 100 mass %. The use of bio-derived farnesene can reduce the use of conjugated dienes other than farnesene such as petroleum-derived butadiene and isoprene, thereby lowering the dependence on petroleum. From this point of view, the content of the structural units (b1) derived from farnesene in the polymer block (B1) is preferably 50 to 100 mass %, more preferably 60 to 100 mass %, still more preferably 70 to 100 mass %, and further preferably 80 to 100 mass %.

The polymer block (B1) may contain structural units (b2) derived from a conjugated diene other than farnesene (hereinafter, also written simply as the "structural units (b2)"). Examples of such conjugated dienes include isoprene, butadiene, 2,3-dimethyl-butadiene, 2-phenyl-butadiene, 1,3-pentadiene, 2-methyl-1,3-pentadiene, 1,3-hexadiene, 1,3-octadiene, 1,3-cyclohexadiene, 2-methyl-1,3-octadiene, 1,3,7-octatriene, myrcene and chloroprene. These may be used singly, or two or more may be used in combination. Among those described above, isoprene, butadiene and myrcene are preferable, and isoprene and butadiene are more preferable.

The content of the structural units (b2) derived from a conjugated diene other than farnesene in the polymer block (B1) is 99 to 0 mass %. If the content of the structural units (b2) derived from such a conjugated diene is more than 99 mass %, the thermoplastic elastomer composition obtained by melt-kneading will not be uniform. From this point of view, the content of the structural units (b2) derived from such a conjugated diene in the polymer block (B1) is preferably 90 to 0 mass %, more preferably 80 to 0 mass %, still more preferably 70 to 0 mass %, further preferably 50 to 0 mass %, and particularly preferably 30 to 0 mass %. The dependence on petroleum can be lowered by using bio-derived farnesene. From this point of view, the content of the structural units (b2) derived from a conjugated diene in the polymer block (B1) is preferably 50 to 0 mass %, more preferably 40 to 0 mass %, still more preferably 30 to 0 mass %, and further preferably 20 to 0 mass %.

The polymer block (B1) may contain additional structural units other than the structural units (b1) and the structural units (b2). The total content of the structural units (b1) and the structural units (b2) in the polymer block (B1) is preferably 60 mass % or more, more preferably 80 mass % or more, and still more preferably 100 mass %. The total content of the structural units (b1) and the structural units (b2) may be determined by 1H-NMR, specifically, by the method described in Examples.

The hydrogenated block copolymer (II) is a hydrogenated product of a block copolymer (P) including at least one polymer block (A1) and at least one polymer block (B1). The hydrogenated block copolymer (II) is preferably a hydrogenated product of a block copolymer (P) including at least two polymer blocks (A1) and at least one polymer block (B1).

The manner in which the polymer blocks (A1) and the polymer blocks (B1) are bonded is not particularly limited and may be linear, branched, radial or a combination of two or more thereof. In particular, the blocks are preferably bonded linearly to one another. The manner of bonding is preferably represented by $(A1-B1)_l$, $A1-(B1-A1)_m$ or $B1-(A1-B1)_n$, in which A1 indicates the polymer block (A1) and B1 indicates the polymer block (B1). The letters l, m and n each independently indicate an integer of 1 or greater.

From points of view such as flexibility, shaping processability and handleability, the manner of bonding preferably has blocks in the order of polymer block (A1), polymer block (B1) and polymer block (A1). The hydrogenated block copolymer (II) is preferably a hydrogenated product of a triblock copolymer represented by A1-B1-A1.

When the block copolymer (P) has two or more polymer blocks (A1) or two or more polymer blocks (B1), the polymer blocks may be composed of the same structural units or may be composed of different structural units. For example, the two polymer blocks (A1) in the triblock copolymer represented by A1-B1-A1 may include the same or different types of aromatic vinyl compounds.

The mass ratio [(A1)/(B1)] of the polymer block (A1) to the polymer block (B1) in the block copolymer (P) is 1/99 to 70/30. This range ensures that the thermoplastic elastomer composition that is obtained has excellent flexibility and shaping processability and exhibits a high bond strength with respect to, for example, highly polar synthetic resins, ceramics and metals. From this point of view, the mass ratio [(A1)/(B1)] of the polymer block (A1) to the polymer block (B1) is preferably 1/99 to 60/40, more preferably 5/95 to 55/45, still more preferably 10/90 to 50/50, and further preferably 15/85 to 40/60.

[Polymer Blocks (C1)]

The hydrogenated block copolymer (II) may be a hydrogenated product of a block copolymer (P) that includes the polymer block (A1) and the polymer block (B1) described hereinabove and further includes a polymer block (C1) (hereinafter, also written as the "polymer block (C1)"). The polymer block (C1) contains less than 1 mass % of structural units (c1) derived from farnesene, and 1 to 100 mass % of structural units (c2) derived from a conjugated diene other than farnesene.

As a result of the incorporation of the polymer block (C1), the thermoplastic elastomer composition that is obtained attains excellent tensile characteristics and shaping processability, and exhibits a high bond strength with respect to, for example, highly polar synthetic resins, ceramics and metals.

Examples of the farnesene that forms the structural units (c1) derived from farnesene (hereinafter, also written simply as the "structural units (c1)") include those described hereinabove with respect to the farnesene that forms the structural units (b1) derived from farnesene. Examples of the conjugated diene that forms the structural units (c2) derived from a conjugated diene other than farnesene (hereinafter, also written simply as the "structural units (c2)") include those described hereinabove with respect to the conjugated diene that forms the structural units (b2) derived from a conjugated diene other than farnesene.

Among the conjugated dienes for forming the structural units (c2) derived from a conjugated diene other than farnesene, isoprene, butadiene and myrcene are preferable. Isoprene and butadiene are more preferable. Butadiene is still more preferable from the point of view of adhesion to a highly polar material.

Here, the phrase that the polymer block (C1) contains "less than 1 mass % of structural units (c1) derived from farnesene" means that the content of the structural units (c1) may be 0 mass %, that is, the structural units (c1) may be absent. The content of the structural units (c1) derived from farnesene in the polymer block (C1) is preferably 0 mass %.

The content of the structural units (c2) derived from a conjugated diene other than farnesene in the polymer block (C1) is preferably 60 to 100 mass %, more preferably 80 to 100 mass %, still more preferably 90 to 100 mass %, further preferably more than 99 mass % and 100 mass % or less, and particularly preferably 100 mass %.

The polymer block (C1) may contain additional structural units other than the structural units (c1) derived from farnesene and the structural units (c2) derived from a conjugated diene other than farnesene.

The total content of the structural units (c1) and the structural units (c2) in the polymer block (C1) is preferably 60 mass % or more, more preferably 80 mass % or more, and still more preferably 100 mass %.

The hydrogenated block copolymer (II) is preferably a hydrogenated product of a block copolymer (P) having at least one polymer block (B1) at a terminal. When at least one polymer block (B1) is present at a terminal of the polymer chain, flexible shaped articles tend to be obtained easily. From this point of view, a hydrogenated block copolymer (II) that is linear more preferably has the polymer blocks (B1) at both terminals. A hydrogenated block copolymer (II) that is branched or radial preferably has the polymer blocks (B1) at 2 or more terminals, more preferably 3 or more terminals.

When the block copolymer (P) further includes the polymer block (C1), the block copolymer (P) is preferably a block copolymer that includes at least two polymer blocks (A1), at least one polymer block (B1) and at least one polymer block (C1), and is more preferably a block copolymer that includes at least two polymer blocks (A1), at least one polymer block (B1) and at least one polymer block (C1) and in which at least one polymer block (B1) is present at a terminal.

When the block copolymer (P) includes the polymer block (A1), the polymer block (B1) and the polymer block (C1), the manner in which the polymer blocks are bonded to one another is not particularly limited and may be linear, branched, radial or a combination of two or more thereof. In particular, the blocks are preferably bonded linearly to one another.

The block copolymer (P) preferably has a structure having blocks in the order of the polymer block (B1), the polymer block (A1) and the polymer block (C1) (that is, a B1-A1-C1 structure).

The block copolymer (P) is preferably a tetrablock copolymer represented by B1-A1-C1-A1 in which A1 indicates the polymer block (A1), B1 the polymer block (B1) and C1 the polymer block (C1), or is preferably a pentablock copolymer represented by B1-A1-C1-A1-B1, or B1-A1-(C1-A1)$_p$-B1, B1-A1-(C1-A1-B1)$_q$ or B1-(A1-C1-A1-B1)$_r$ (p, q and r each independently indicate an integer of 2 or greater), and is more preferably a pentablock copolymer represented by B1-A1-C1-A1-B1.

In the present specification, when polymer blocks of the same type are bonded linearly to each other via, for example, a divalent coupling agent, the whole of the polymer blocks bonded to each other is regarded as one polymer block. According to this, the whole of polymer blocks that should be described as A1-X-A1 in a strict sense (X denotes a coupling agent residue) is written as A1. Because such polymer blocks containing a coupling agent residue are regarded as described above in the present specification, for example, a block copolymer that contains a coupling agent residue and should be described as B1-A1-C1-X-C1-A1-B1 in a strict sense is written as B1-A1-C1-A1-B1 and is regarded as a pentablock copolymer.

When the block copolymer (P) includes two or more polymer blocks (A1), these polymer blocks may be composed of the same structural units or may be composed of different structural units from one another. Similarly, when the block copolymer (P) includes two or more polymer blocks (B1) or two or more polymer blocks (C1), the polymer blocks may be composed of the same structural units or may be composed of different structural units from one another.

When the block copolymer (P) includes the polymer block (A1), the polymer block (B1) and the polymer block (C1), the mass ratio [(A1)/(B1)] of the polymer block (A1) to the polymer block (B1) is 1/99 to 70/30, preferably 5/95 to 60/40, more preferably 10/90 to 50/50, and still more preferably 15/85 to 40/60. This range ensures that the thermoplastic elastomer composition that is obtained has excellent shaping processability and exhibits a strong bond strength with respect to highly polar synthetic resins.

In the block copolymer (P), the mass ratio [(A1)/((B1)+(C1))] of the polymer block (A1) to the total of the polymer block (B1) and the polymer block (C1) is preferably 1/99 to 70/30. This range ensures that the thermoplastic elastomer that is obtained has excellent tensile characteristics and shaping processability and exhibits a high bond strength with respect to highly polar synthetic resins. From this point of view, the mass ratio [(A1)/((B1)+(C1))] is more preferably 1/99 to 60/40, still more preferably 10/90 to 40/60, even more preferably 10/90 to 30/70, and further preferably 15/85 to 25/75.

The total content of the structural units (b1) and the structural units (c1) in the total amount of the polymer block (B1) and the polymer block (C1) in the block copolymer (P), namely, [((b1)+(c1))/((B1)+(C1))] is preferably 30 to 99 mass %. This range ensures that the composition attains excellent tensile characteristics, shaping processability and adhesion with respect to metals. From this point of view, the mass ratio [((b1)+(c1))/((B1)+(C1))] is more preferably 40 to 90 mass %, still more preferably 45 to 80 mass %, further preferably 50 to 70 mass %, and particularly preferably 55 to 65 mass %.

The total content of the polymer block (A1), the polymer block (B1) and the polymer block (C1) in the block copolymer (P) is preferably 80 mass % or more, more preferably 90 mass % or more, still more preferably 95 mass % or more, and further preferably 100 mass %.

From the points of view of tensile characteristics, shaping processability and adhesion with respect to metals, the hydrogenated block copolymer (II) is preferably such that the hydrogenated block copolymer (II) is a hydrogenated product of a block copolymer (P) including polymer blocks (A1), a polymer block (B1) and a polymer block (C1); the polymer block (C1) is a polymer block that contains less than 1 mass % of structural units (c1) derived from farnesene, and 1 to 100 mass % of structural units (c2) derived from a conjugated diene other than farnesene; the mass ratio [(A1)/((B1)+(C1))] of the polymer blocks (A1) to the total of the polymer block (B1) and the polymer block (C1) is 1/99 to 70/30; the block copolymer (P) includes at least two polymer blocks (A1), at least one polymer block (B1) and at least one polymer block (C1) and has at least one polymer block (B1) at a terminal; and the hydrogenation ratio of carbon-carbon double bonds in the polymer block (B1) and the polymer block (C1) is 50 to 100 mol %.

As long as the advantageous effects of the present invention are not impaired, the block copolymer (P) may include a polymer block composed of an additional monomer, in addition to the polymer block (A1), the polymer block (B1) and the polymer block (C1).

Examples of such additional monomers include unsaturated hydrocarbon compounds such as propylene, 1-butene, 1-pentene, 4-methyl-1-pentene, 1-hexene, 1-octene, 1-decene, 1-undecene, 1-dodecene, 1-tridecene, 1-tetradecene, 1-pentadecene, 1-hexadecene, 1-heptadecene, 1-octadecene, 1-nonadecene and 1-eicosene; and functional group-containing unsaturated compounds such as acrylic acid, methacrylic acid, methyl acrylate, methyl methacrylate, acrylonitrile, methacrylonitrile, maleic acid, fumaric acid, crotonic acid, itaconic acid, 2-acryloylethanesulfonic acid, 2-methacryloylethanesulfonic acid, 2-acrylamido-2-methylpropanesulfonic acid, 2-methacrylamido-2-methylpropanesulfonic acid, vinylsulfonic acid, vinyl acetate and methyl vinyl ether. These may be used singly, or two or more may be used in combination.

When the block copolymer (P) includes such an additional polymer block, the content thereof is preferably 20 mass % or less, more preferably 10 mass % or less, and still more preferably 5 mass % or less.

[Methods for Producing the Hydrogenated Block Copolymer (II)]

For example, the hydrogenated block copolymer (II) may be suitably produced by a polymerization step in which a block copolymer (P) is obtained by anionic polymerization, and a step in which the block copolymer (P) is hydrogenated at carbon-carbon double bonds in a polymer block (B1) or, when the copolymer includes a polymer block (C1), carbon-carbon double bonds in a polymer block (B1) and a polymer block (C1).

(Polymerization Step)

For example, the block copolymer (P) may be produced by a solution polymerization process or by the process described in JP-A-2012-502135 or JP-A-2012-502136. In particular, a solution polymerization process is preferable. For example, a known process may be adopted such as an ionic polymerization process such as anionic polymerization or cationic polymerization, or a radical polymerization process. Among such processes, an anionic polymerization process is preferable. In an exemplary anionic polymerization process, a block copolymer (P) is obtained by sequentially adding an aromatic vinyl compound, farnesene and/or a conjugated diene other than farnesene in the presence of a solvent, an anionic polymerization initiator and, if necessary, a Lewis base.

In the present polymerization step, the block copolymer (P) that is obtained may be unmodified as described above. However, a modified block copolymer (P) may be obtained as described below.

The block copolymer (P) described above may be modified before the hydrogenation step described later to give a modified block copolymer (P). Examples of the functional groups that may be introduced include amino groups, alkoxysilyl groups, hydroxyl groups, epoxy groups, carboxyl groups, carbonyl groups, mercapto groups, isocyanate groups and acid anhydride groups.

For example, the block copolymer may be modified by adding, before the addition of a polymerization terminator, an agent capable of reacting with active ends of the polymer, for example, a coupling agent such as tin tetrachloride, tetrachlorosilane, dichlorodimethylsilane, dimethyldiethoxysilane, tetramethoxysilane, tetraethoxysilane, 3-aminopropyltriethoxysilane, tetraglycidyl-1,3-bisaminomethylcyclohexane or 2,4-tolylene diisocyanate, a chain end-modifying agent such as 4,4'-bis(diethylamino)benzophenone or N-vinylpyrrolidone, or any of the modifying agents described in JP-A-2011-132298. Furthermore, for example, maleic anhydride may be grafted to the copolymer that has been isolated.

The functional groups may be introduced at chain ends or side chains of the block copolymer (P). The functional groups may be of a single kind or may be a combination of two or more kinds. The modifying agent is preferably used in a molar equivalent of 0.01 to 10 per mol of the anionic polymerization initiator.

(Hydrogenation Step)

The block copolymer (P) or the modified block copolymer (P) obtained by the above process is subjected to the hydrogenation step to give a hydrogenated block copolymer (II). A known hydrogenation process may be used. For example, the block copolymer (P) is dissolved into a solvent that does not affect the hydrogenation reaction, and the hydrogenation reaction is performed in the solution in the presence of a hydrogenation catalyst, for example, a Ziegler catalyst; a metal catalyst composed of nickel, platinum, palladium, ruthenium or rhodium supported on a carrier such as carbon, silica or diatomaceous earth; or an organic metal complex having cobalt, nickel, palladium, rhodium or ruthenium metal. In the hydrogenation step, the hydrogenation reaction may be performed by adding the hydrogenation catalyst to the polymerization reaction solution that contains the block copolymer (P) obtained by the above-described method for producing the block copolymer (P). In the present invention, palladium carbon in which palladium is supported on carbon is preferable.

In the hydrogenation reaction, the hydrogen pressure is preferably 0.1 to 20 MPa, the reaction temperature is preferably 100 to 200° C., and the reaction time is preferably 1 to 20 hours.

The hydrogenation ratio of carbon-carbon double bonds in the polymer block (B1) is 50 to 100 mol % from the points of view of heat resistance and weather resistance, and is preferably 70 to 100 mol %, more preferably 75 to 100 mol %, still more preferably 80 to 100 mol %, further preferably 85 to 100 mol %, and particularly preferably 90 to 100 mol %.

When the block copolymer (P) includes the polymer block (C1), the hydrogenation ratio of carbon-carbon double bonds in the polymer block (B1) and the polymer block (C1) is 50 to 100 mol % from the points of view of heat resistance and weather resistance, and is preferably 70 to 100 mol %, more preferably 75 to 100 mol %, still more preferably 80 to 100 mol %, further preferably 85 to 100 mol %, and particularly preferably 90 to 100 mol %.

The hydrogenation ratio may be calculated by $^1$H-NMR measurement of the block copolymer (P) and the hydrogenated block copolymer (II) after hydrogenation.

From the point of view of shaping processability, the peak-top molecular weight (Mp) of the hydrogenated block copolymer (II) is preferably 4,000 to 1,500,000, more preferably 9,000 to 1,000,000, still more preferably 30,000 to 800,000, and further preferably 50,000 to 500,000.

The molecular weight distribution (Mw/Mn) of the hydrogenated block copolymer (II) is preferably 1.00 to 6.00, more preferably 1.00 to 4.00, still more preferably 1.00 to 3.00, and further preferably 1.00 to 2.00. When the molecular weight distribution is in the above range, the hydrogenated block copolymer (II) has a small variation in viscosity and is easy to handle.

The peak-top molecular weight (Mp), the weight average molecular weight (Mw) and the number average molecular weight (Mn) of the hydrogenated block copolymer (II) are values measured by gel permeation chromatography relative to standard polystyrene. The molecular weight distribution (Mw/Mn) is a value calculated from the values of Mw and Mn.

From the point of view of shaping processability, the peak-top molecular weight of the polymer block (A1) is preferably 2,000 to 100,000, more preferably 4,000 to 80,000, still more preferably 5,000 to 50,000, and further preferably 6,000 to 30,000.

From the point of view of shaping processability, the peak-top molecular weight of the polymer block (B1) is preferably 2,000 to 200,000, more preferably 3,000 to 150,000, and still more preferably 4,000 to 100,000.

From the point of view of shaping processability, the peak-top molecular weight of the polymer block (C1) is preferably 4,000 to 200,000, more preferably 4,500 to 150,000, and still more preferably 5,000 to 100,000.

In the thermoplastic elastomer composition of the present invention, the content of the acrylic block copolymer (I) is 70 to 300 parts by mass with respect to 100 parts by mass of the hydrogenated block copolymer (II). If the content of the acrylic block copolymer (I) is less than 70 parts by mass, laminating of the thermoplastic elastomer composition of the present invention onto a further material results in low and practically insufficient adhesion between the layer of the thermoplastic elastomer composition and the layer of the further material in the laminate structure. If, on the other hand, the content of the acrylic block copolymer (I) is more than 300 parts by mass, the shaping processability may be lowered. From the points of view of the adhesion of the laminate structure and the shaping processability, the content of the acrylic block copolymer (I) in the thermoplastic elastomer composition is preferably 75 to 280 parts by mass, and more preferably 80 to 250 parts by mass with respect to 100 parts by mass of the hydrogenated block copolymer (II).

In the thermoplastic elastomer composition of the present invention, the total content of the acrylic block copolymer (I) and the hydrogenated block copolymer (II) is preferably 50 mass % or more of the total amount of the thermoplastic elastomer composition, and is more preferably 55 mass % or more, and still more preferably 60 mass % or more, and is preferably 99 mass % or less in order to obtain good adhesion stably, and is more preferably 90 mass % or less, and still more preferably 80 mass % or less.

<Polar Group-Containing Polymers (III)>

The thermoplastic elastomer composition of the present invention may include a polar group-containing polymer (III). In this case, the composition attains excellent flexibility, tensile characteristics and shaping processability, and can exhibit a high bond strength even with respect to, for example, highly polar synthetic resins, ceramics and metals.

The reasons behind such advantageous effects are not fully understood in detail, but are probably because, for example, the incorporation of the polar group-containing polymer (III) improves compatibility and dispersibility in the thermoplastic elastomer composition of the present invention, and also because when a highly polar material as an adherend has polar groups, chemical bonds are formed between the polar groups in the polar group-containing polymer (III) and the polar groups on the surface of the adherend.

Examples of the polar groups contained in the polar group-containing polymer (III) include (meth)acryloyloxy groups; hydroxyl groups; urethane groups; amide groups; halogen groups such as fluoro, chloro and bromo; carboxyl groups; ester groups; and acid anhydride groups. Among those described above, (meth)acryloyloxy groups, urethane groups, carboxyl groups, ester groups and acid anhydride groups are preferable to attain enhanced adhesion with respect to, for example, highly polar synthetic resins, ceramics and metals, and urethane groups, carboxyl groups and acid anhydride groups are more preferable.

[Block Copolymers (III-a)]

The polar group-containing polymer (III) that contains a urethane group as the polar group is preferably a block copolymer (III-a) that includes: a polymer block (F) including a block copolymer or a hydrogenated product thereof (hereinafter, this polymer block is also written simply as the "polymer block (F)") wherein the block copolymer includes a polymer block (A2) containing structural units derived from an aromatic vinyl compound (hereinafter, this polymer block is also written simply as the "polymer block (A2)") and a polymer block (B2) containing structural units derived from a conjugated diene other than farnesene (hereinafter, this polymer block is also written simply as the "polymer block (B2)"); and a thermoplastic polyurethane elastomer block (G) (hereinafter, also written simply as the "elastomer block (G)").

The polymer block (A2) contains structural units derived from an aromatic vinyl compound. Examples of the aromatic vinyl compounds include the aromatic vinyl compounds for forming the polymer block (A1) described hereinabove.

The polymer block (B2) contains structural units derived from a conjugated diene other than farnesene. Examples of the conjugated dienes include the conjugated dienes for forming the structural units (b2) described hereinabove that are derived from a conjugated diene other than farnesene.

The polymer block (A2) may contain structural units derived from an additional monomer other than aromatic vinyl compounds, for example, structural units derived from a monomer for forming the polymer block (B2). The content of the structural units derived from the aromatic vinyl compound in the polymer block (A2) is preferably 60 mass % or more, more preferably 70 mass % or more, still more preferably 80 mass % or more, further preferably 90 mass % or more, and particularly preferably 100 mass %.

The polymer block (B2) may contain structural units derived from an additional monomer other than conjugated dienes other than farnesene, for example, structural units derived from a monomer for forming the polymer block (A2). The content of the structural units derived from the conjugated diene other than farnesene in the polymer block (B2) is preferably 60 mass % or more, more preferably 70 mass % or more, still more preferably 80 mass % or more, further preferably 90 mass % or more, and particularly preferably 100 mass %.

From the points of view of heat resistance and rubber properties of products such as shaped articles and laminate structures obtained from the thermoplastic elastomer composition, the mass ratio ((A2)/(B2)) of the polymer block (A2) to the polymer block (B2) in the polymer block (F) is preferably 10/90 to 90/10, more preferably 20/80 to 80/20, and still more preferably 30/70 to 70/30.

The total content of the polymer block (A2) and the polymer block (B2) in the polymer block (F) is preferably 60 mass % or more, more preferably 80 mass % or more, and still more preferably 100 mass %.

The elastomer block (G) may be any block including a thermoplastic polyurethane elastomer. From the point of view of rubber properties of the thermoplastic elastomer composition, the number average molecular weight of the elastomer block (G) is preferably 200 to 150,000, and more preferably 500 to 100,000.

The block copolymer (III-a) includes at least one polymer block (F) and at least one elastomer block (G). The block copolymer (III-a) may be a polyblock copolymer in which a total of three or more polymer block(s) (F) and elastomer block(s) (G) are bonded to one another. From the points of view of compatibility, shaping processability and mechanical characteristics, the block copolymer (III-a) is preferably a diblock copolymer in which one polymer block (F) and one elastomer block (G) are bonded to each other.

For example, the block copolymer (III-a) may be obtained by kneading a thermoplastic polyurethane elastomer and a block copolymer including a polymer block (A2) and a polymer block (B2) and having a functional group, preferably a hydroxyl group, at a terminal, or a hydrogenated product of the block copolymer (hereinafter, the block copolymer or the hydrogenated product thereof will be also written as the "terminal-modified block copolymer") to react the thermoplastic polyurethane elastomer and the block copolymer under molten conditions, and extracting and recovering the polyurethane block copolymer from the resultant polyurethane reaction product.

In the above process, the thermoplastic polyurethane elastomer and the terminal-modified block copolymer may be melt-kneaded with a melt-kneading device such as a single-screw extruder, a twin-screw extruder, a kneader or a Banbury mixer. The melt-kneading conditions may be selected in accordance with factors such as the types of the thermoplastic polyurethane elastomer and the terminal-modified block copolymer that are used, and the type of the device. The melt-kneading is preferably performed at a temperature of 180 to 250° C. for about 1 to 15 minutes.

Alternatively to the above process, the block copolymer (III-a) may be obtained by, for example, producing a thermoplastic polyurethane elastomer by reacting a high-molecular diol, an organic diisocyanate and a chain extender in a device such as an extruder while adding the terminal-modified block copolymer into the system at the beginning or in the middle of the reaction to form a polyurethane reaction product containing a polyurethane block copolymer, and extracting and recovering the polyurethane block copolymer from the polyurethane reaction product.

In the above process, for example, the polyurethane block copolymer may be extracted and recovered from the polyurethane reaction product in such a manner that the polyurethane reaction product is pulverized to an appropriate size as required and is treated with a good solvent for polyurethane such as dimethylformamide to extract and remove the unreacted thermoplastic polyurethane elastomer, subsequently the residue is treated with a good solvent for the terminal-modified block copolymer such as cyclohexane to extract and remove the unreacted terminal-modified block copolymer, and the residual solid is dried.

For example, the terminal-modified block copolymer may be produced by the anionic polymerization method described below. An aromatic vinyl compound and a conjugated diene are sequentially polymerized in an inert organic solvent such as n-hexane or cyclohexane in the presence of a polymerization initiator such as an alkyllithium compound until the desired molecular structure and molecular weight are obtained. Subsequently, a compound, for example, an oxirane skeleton-containing compound such as ethylene oxide, propylene oxide or styrene oxide, or a lactone compound such as ε-caprolactone, β-propiolactone or dimethylpropiolactone (pivalolactone) is added. Next, the polymerization is terminated by the addition of an active hydrogen-containing compound such as an alcohol, a carboxylic acid or water, thereby producing a block copolymer. The block copolymer is then hydrogenated, preferably in an inert organic solvent such as n-hexane or cyclohexane in the presence of a hydrogenation catalyst such as a Ziegler catalyst composed of a combination of an alkylaluminum compound or an alkyllithium compound, and a transition metal compound such as of cobalt or nickel under conditions where the reaction temperature is 20 to 250° C. and the hydrogen pressure is 0.1 to 20 MPa, thereby producing a hydrogenated terminal-modified block copolymer.

When the structure is linear, the terminal-modified block copolymer may have one hydroxyl group at one of the molecular terminals, or may have two hydroxyl groups at both molecular terminals. When the structure is branched or radial, the terminal-modified block copolymer may have one or a plurality of hydroxyl groups at the molecular terminal or terminals, that is, as many hydroxyl groups as the number of branches. When, for example, the structure is linear, the number of terminal hydroxyl groups per molecule of the terminal-modified block copolymer is preferably 0.5 to 1, and more preferably 0.7 to 1.

[Block Copolymers (III-b)]

The polar group-containing polymer (III) that contains a carboxyl group or an acid anhydride group as the polar group is preferably a polymer (III-b) that contains a functional group derived from an α,β-unsaturated carboxylic acid or a derivative thereof (hereinafter, this polymer is also written simply as the "polymer (III-b)").

Examples of the α,β-unsaturated carboxylic acids and the derivatives thereof include α,β-unsaturated carboxylic acids such as (meth)acrylic acid, maleic acid, fumaric acid and itaconic acid; α,β-unsaturated carboxylic acid esters such as (meth)acrylic acid esters; and α,β-unsaturated carboxylic acid anhydrides such as maleic anhydride and itaconic anhydride. Among those described above, at least one selected from the group consisting of α,β-unsaturated carboxylic acid esters and α,β-unsaturated carboxylic acid anhydrides is preferable, and at least one selected from the group consisting of (meth)acrylic acid esters and maleic anhydride is more preferable.

Specific examples of the (meth)acrylic acid esters include acrylic acid alkyl esters such as methyl acrylate, ethyl acrylate, n-propyl acrylate, isopropyl acrylate, n-butyl acrylate, isobutyl acrylate, n-hexyl acrylate, isohexyl acrylate, n-octyl acrylate, isooctyl acrylate and 2-ethylhexyl acrylate; and methacrylic acid alkyl esters such as methyl methacrylate, ethyl methacrylate, n-propyl methacrylate, isopropyl methacrylate, n-butyl methacrylate, isobutyl methacrylate, n-hexyl methacrylate, isohexyl methacrylate, n-octyl methacrylate, isooctyl methacrylate and 2-ethylhexyl methacrylate.

The functional group derived from the α,β-unsaturated carboxylic acid or the derivative thereof may be introduced into the polymer chain by copolymerizing the α,β-unsaturated carboxylic acid or the derivative thereof with a monomer having no polar groups by a known random copolymerization, block copolymerization or graft copolymerization process.

The monomer having no polar groups is preferably a C2-C10 olefin, and more preferably a C2-C8 olefin. Examples of such olefins include ethylene, propylene, 1-butene, 1-pentene, 1-hexene, 1-octene, 4-methyl-1-pentene and cyclohexene. Among those described above, ethylene and propylene are preferable, and ethylene is more preferable. The olefins may be used singly, or two or more may be used in combination.

The polymer (III-b) may be a copolymer that contains structural units derived from an olefin, and structural units derived from an α,β-unsaturated carboxylic acid or a derivative thereof. Examples thereof include ethylene-(meth)acrylic acid copolymers; ethylene-(meth)acrylic acid alkyl ester copolymers containing structural units derived from ethylene and structural units derived from a (meth)acrylic acid alkyl ester, such as ethylene-methyl (meth)acrylate copolymer and ethylene-ethyl (meth)acrylate copolymer; and metal ion-crosslinked resins (ionomers) of ethylene-(meth)acrylic acid copolymers. Among those described above, ethylene-(meth)acrylic acid alkyl ester copolymers are more preferable.

The content of the structural units derived from an α,β-unsaturated carboxylic acid or a derivative thereof is preferably 0.01 to 10 mass % of all the structural units in the polar group-containing polymer (III-b). When the content is 0.01 mass % or more, the thermoplastic elastomer composition that is obtained can bond to a highly polar material even by heat treatment at a low temperature, and exhibits a high bond strength. When the content of the structural units derived from an α,β-unsaturated carboxylic acid or a derivative thereof is 10 mass % or less, the affinity for the hydrogenated block copolymer (II) is enhanced to offer good tensile characteristics, and the thermoplastic elastomer composition that is obtained attains excellent flexibility and shaping processability. From these points of view, the content of the structural units derived from an α,β-unsaturated carboxylic acid or a derivative thereof is more preferably 0.01 to 7 mass %, and still more preferably 0.01 to 5 mass %. In order to optimize the content of the structural units derived from an α,β-unsaturated carboxylic acid or a derivative thereof, the polar group-containing polymer (III-b) that is used may be prepared by diluting a polyolefin that contains a high concentration of structural units derived from an α,β-unsaturated carboxylic acid or a derivative thereof with a polyolefin having no units derived from an α,β-unsaturated carboxylic acid or a derivative thereof.

The functional group derived from an α,β-unsaturated carboxylic acid or a derivative thereof may be introduced into the polymer chain also by acid modification in which an α,β-unsaturated carboxylic acid anhydride is grafted onto side chains of the polymer chain. A preferred polar group-containing polymer (III-b) obtained by such a method is an acid-modified polymer obtained by grafting maleic anhydride onto side chains of the polymer chain.

Examples of the polymers that constitute the above acid-modified polymers include aromatic vinyl compound-conjugated diene block copolymers, and polyolefins. Among those described above, at least one is preferably selected from the group consisting of block copolymers (III-b1) that include block copolymers including a polymer block (A3) containing structural units derived from an aromatic vinyl compound (hereinafter, this polymer block is also written simply as the "polymer block (A3)") and a polymer block (B3) containing structural units derived from a conjugated diene other than farnesene (hereinafter, this polymer block is also written simply as the "polymer block (B3)"), and hydrogenated products of such block copolymers, and polyolefins (III-b2). A block copolymer (III-b1) is more preferable.

The polymer block (A3) in the block copolymer (III-b1) contains structural units derived from an aromatic vinyl compound. Examples of the aromatic vinyl compounds include the aromatic vinyl compounds for forming the polymer block (A1) described hereinabove.

The polymer block (B3) in the block copolymer (III-b1) contains structural units derived from a conjugated diene other than farnesene. Examples of the conjugated dienes include the conjugated dienes for forming the structural units (b2) described hereinabove that are derived from a conjugated diene other than farnesene. In particular, isoprene and butadiene are preferable, and butadiene is more preferable.

The polymer block (A3) may contain structural units derived from an additional monomer other than aromatic vinyl compounds, for example, structural units derived from a monomer for forming the polymer block (B3). The content of the structural units derived from the aromatic vinyl compound in the polymer block (A3) is preferably 60 mass % or more, more preferably 70 mass % or more, still more preferably 80 mass % or more, further preferably 90 mass % or more, and particularly preferably 100 mass %.

The polymer block (B3) may contain structural units derived from an additional monomer other than conjugated dienes other than farnesene, for example, structural units derived from a monomer for forming the polymer block (A3). The content of the structural units derived from the conjugated diene other than farnesene in the polymer block (B3) is preferably 60 mass % or more, more preferably 70 mass % or more, still more preferably 80 mass % or more, and further preferably 90 mass % or more.

From the points of view of heat resistance and rubber properties of products such as shaped articles and laminate structures obtained from the thermoplastic elastomer composition, the mass ratio [(A3)/(B3)] of the polymer block (A3) to the polymer block (B3) in the block copolymer (III-b1) is preferably 10/90 to 90/10, more preferably 20/80 to 80/20, and still more preferably 30/70 to 70/30.

The total content of the polymer block (A3) and the polymer block (B3) in the block copolymer (III-b1) is preferably 60 mass % or more, more preferably 80 mass % or more, and still more preferably 100 mass %.

The block copolymer (III-b1) is preferably at least one selected from the group consisting of hydrogenated products of polystyrene-polybutadiene-polystyrene triblock copolymers (SEBS), hydrogenated products of polystyrene-polyisoprene-polystyrene triblock copolymers (SEPS) and hydrogenated products of polystyrene-poly(isoprene/butadiene)-polystyrene triblock copolymers (SEEPS). Hydrogenated products of polystyrene-polybutadiene-polystyrene triblock copolymers (SEBS) are more preferable. These may be used singly, or two or more may be used in combination.

The olefins that constitute the polyolefins (III-b2) are preferably C2-C10 olefins, and more preferably C2-C8 olefins. Examples of such olefins include ethylene, propylene, 1-butene, 1-pentene, 1-hexene, 1-octene, 4-methyl-1-pentene and cyclohexene. The olefins may be used singly, or two or more may be used in combination. Among those described above, ethylene and propylene are preferable.

When the polymer that constitutes the acid-modified polymer is the polyolefin (III-b2), the polar group-containing polymer (III-b) may be, for example, a maleic anhydride-modified polyolefin such as of low-density polyethylene, medium-density polyethylene, high-density polyethylene, polypropylene or ethylene-propylene copolymer.

In a preferred embodiment, the thermoplastic elastomer composition of the present invention includes, as the polar group-containing polymer (III), a hydrophilic group-containing block copolymer (III-c) having a structure in which polyolefin blocks and hydrophilic polymer blocks are bonded alternately to one another. This configuration enhances the dispersibility of both the acrylic block copolymer (I) and the hydrogenated block copolymer (II), and improves the tensile strength and the bond strength of the thermoplastic elastomer composition of the present invention.

Examples of the hydrophilic group-containing block copolymers (III-c) include polymers described in JP-A-2001-278985 in which polyolefin blocks and hydrophilic polymer blocks are bonded repeatedly and alternately to one another via, for example, ester bonds, amide bonds, ether bonds, urethane bonds or imide bonds. The polyolefin blocks constituting the hydrophilic group-containing block copolymer (III-c) are suitably polyolefins having carbonyl groups, preferably carboxyl groups, at both terminals of the polymer, polyolefins having hydroxyl groups at both terminals of the polymer, or polyolefins having amino groups at both terminals of the polymer. Furthermore, the polyolefin blocks may be polyolefins having a carbonyl group, preferably a carboxyl group, at one terminal of the polymer, polyolefins having a hydroxyl group at one terminal of the polymer, or polyolefins having an amino group at one terminal of the polymer. Among those described above, polyolefins having a carbonyl group or carbonyl groups are preferable because of easy modification.

The hydrophilic polymer blocks constituting the hydrophilic group-containing block copolymer (III-c) may be polyethers, polyether-containing hydrophilic polymers, cationic polymers or anionic polymers. More specifically, the hydrophilic polymer blocks may be, for example, polyether diols, polyether diamines, modified products of these polymers, polyether ester amides having a segment of polyether diol as a polyether segment-forming component, polyether amide imides having the same segment as described above, polyether esters having the same segment as described above, polyether amides having the same segment as described above, polyether urethanes having the same segment as described above, cationic polymers having 2 to 80, preferably 3 to 60 cationic groups separated by nonionic molecular chains in the molecule, and anionic polymers having a sulfonyl-containing dicarboxylic acid, and a diol or a polyether as essential constituent units and having 2 to 80, preferably 3 to 60 sulfonyl groups in the molecule.

Preferred examples of the hydrophilic group-containing block copolymers (III-c) include hydrophilic group-containing block copolymers obtained by esterifying a modified polypropylene from the reaction of polypropylene with maleic anhydride, with a polyalkylene glycol (such as polyethylene glycol or polypropylene glycol) in the presence of a catalyst. For example, such block copolymers are available under the trade name "PELESTAT 300" (trade name) from Sanyo Chemical Industries, Ltd.

In the thermoplastic elastomer composition of the present invention, the content of the polar group-containing polymer (III) is preferably 1 to 200 parts by mass with respect to 100 parts by mass of the hydrogenated block copolymer (II). When the content of the polar group-containing polymer (III) is 1 part by mass or more, the thermoplastic elastomer composition that is obtained attains good adhesion stably and exhibits a high bond strength. When, on the other hand, the content of the polar group-containing polymer (III) is 200 parts by mass or less, the thermoplastic elastomer composition attains sufficient adhesion and exhibits good flexibility and shaping processability without becoming hard. From these points of view, the content of the polar group-containing polymer (III) is more preferably 5 to 150 parts by mass, still more preferably 7 to 100 parts by mass, and further preferably 8 to 60 parts by mass with respect to 100 parts by mass of the hydrogenated block copolymer (II).

<Softeners (IV)>

A softener (IV) may be further added. However, the thermoplastic elastomer composition of the present invention contains the acrylic block copolymer (I) and the hydrogenated block copolymer (II), and thus has excellent flexibility even without containing a softener. Any softeners generally used for rubbers and plastics may be used as the softeners (IV). Examples include paraffinic, naphthenic and aromatic process oils; phthalic acid derivatives such as dioctyl phthalate and dibutyl phthalate; white oils; mineral oils; liquid ethylene-α-olefin cooligomers; liquid paraffins; polybutenes; low-molecular polyisobutylenes; liquid polydienes such as liquid polybutadiene, liquid polyisoprene, liquid polyisoprene-butadiene copolymer, liquid styrene-butadiene copolymer and liquid styrene-isoprene copolymer; and hydrogenated products of these materials. Among those described above, paraffinic process oils; liquid ethylene-α-olefin cooligomers; liquid paraffins; low-molecular polyisobutylenes; and hydrogenated products of these materials are preferable from the point of view of compatibility with the hydrogenated block copolymer (II). Hydrogenated products of paraffinic process oils are more preferable.

The softener (IV) is preferably one obtained from a high proportion of a plant-derived raw material. The content of a plant-derived component (the bio-based proportion) in the softener (IV) is preferably 70 mass % or more, more preferably 80 mass % or more, and still more preferably 90 mass % or more.

When the thermoplastic elastomer composition of the present invention contains the softener (IV), the content of the softener (IV) is preferably 1 to 200 parts by mass with respect to 100 parts by mass of the hydrogenated block copolymer (II). When the content of the softener (IV) is in the above range, the flexibility and the shaping processability of the thermoplastic elastomer composition are further enhanced. From this point of view, the content of the softener (IV) is more preferably 5 to 180 parts by mass, still more preferably 7 to 150 parts by mass, even more preferably 10 to 120 parts by mass, further preferably 30 to 100 parts by mass, and particularly preferably 40 to 60 parts by mass with respect to 100 parts by mass of the hydrogenated block copolymer (II).

When the thermoplastic elastomer composition of the present invention includes the polar group-containing polymer (III) and the softener (IV), the total content of the acrylic block copolymer (I), the hydrogenated block copolymer (II), the polar group-containing polymer (III) and the softener (IV) is preferably 70 mass % or more, more preferably 80 mass % or more, and still more preferably 90 mass % or more of the total amount of the thermoplastic elastomer composition.

(Other Optional Components)

Where necessary, the thermoplastic elastomer composition of the present invention may contain other components such as inorganic fillers (V), oxidation inhibitors (VI), additional hydrogenated block copolymers (II') other than the hydrogenated block copolymers (II), additional thermoplastic polymers, tackifier resins, lubricants, light stabilizers, processing aids, colorants such as pigments and coloring matters, flame retardants, antistatic agents, matting agents, silicon oils, antiblocking agents, UV absorbers, release agents, foaming agents, antibacterial agents, mildew-proofing agents and fragrances without impairing the advantageous effects of the present invention <Inorganic Fillers (V)>

The inorganic filler (V) may be added for purposes such as to improve properties such as heat resistance and weather resistance of the thermoplastic elastomer composition of the present invention, to control the hardness, and to improve economic efficiency by serving as a bulking agent. Examples of the inorganic fillers (V) include calcium carbonate, talc, magnesium hydroxide, aluminum hydroxide, mica, clay, natural silicic acid, synthetic silicic acid, titanium oxide, carbon black, barium sulfate, glass balloons and glass fibers. The inorganic fillers may be used singly, or two or more may be used in combination.

When the inorganic filler (V) is added, the content thereof is preferably not detrimental to the flexibility of the thermoplastic elastomer composition, and is preferably 200 parts by mass or less, more preferably 150 parts by mass or less, still more preferably 100 parts by mass or less, and particularly preferably 50 parts by mass or less with respect to 100 parts by mass of the hydrogenated block copolymer (II).

<Oxidation Inhibitors (VI)>

Examples of the oxidation inhibitors (VI) include hindered phenolic oxidation inhibitors, phosphorus oxidation inhibitors, lactone oxidation inhibitors and hydroxyl oxidation inhibitors. Among those described above, hindered phenolic oxidation inhibitors are preferable. When the oxidation inhibitor (VI) is added, the content thereof is preferably such that the thermoplastic elastomer composition is not colored when melt-kneaded, and is preferably 0.1 to 5 parts by mass with respect to 100 parts by mass of the hydrogenated block copolymer (II).

<Hydrogenated Block Copolymers (II')>

The thermoplastic elastomer composition of the present invention may contain an additional hydrogenated block copolymer (II') other than the hydrogenated block copolymer (II) (hereinafter, this additional hydrogenated block copolymer is sometimes written simply as the "hydrogenated block copolymer (II')").

For example, the additional hydrogenated block copolymer (II') may be a hydrogenated product of a block copolymer that does not include the polymer block (B1) described hereinabove and does include a polymer block (A1) containing structural units derived from an aromatic vinyl compound, and a polymer block (C1) containing less than 1 mass % of structural units (c1) derived from farnesene and 1 to 100 mass % of structural unit (c2) derived from a conjugated diene other than farnesene. Preferred embodiments of the additional hydrogenated block copolymer (II') such as of the polymer block (A1) and the polymer block (C1), and the hydrogenation ratio are the same as those in the hydrogenated block copolymer (II).

The incorporation of the additional hydrogenated block copolymer (II') allows the thermoplastic elastomer composition to contain a large amount of the softener (IV) without suffering a decrease in adhesion, and the thermoplastic elastomer composition that is obtained attains higher flexibility and good adhesion.

The total content of the polymer block (A1) and the polymer block (C1) in the above block copolymer is preferably 80 mass % or more, more preferably 90 mass % or more, still more preferably 95 mass % or more, and further preferably 100 mass %.

From points of view such as flexibility, shaping processability and handleability, the manner of bonding of the polymer block (A1) and the polymer block (C1) in the hydrogenated block copolymer (II') preferably has blocks in the order of polymer block (A1), polymer block (C1) and polymer block (A1). The hydrogenated block copolymer (II') is preferably a hydrogenated product of a triblock copolymer represented by A1-C1-A1.

When the additional hydrogenated block copolymer (II') is added, the content thereof is preferably 1 to 200 parts by mass, more preferably 10 to 150 parts by mass, and still more preferably 30 to 100 parts by mass with respect to 100 parts by mass of the hydrogenated block copolymer (II).

Examples of the additional thermoplastic polymers include olefin polymers having no polar groups, styrene polymers, polyphenylene ether resins and polyethylene glycols. Among those described above, olefin polymers having no polar groups are advantageous in that the addition of such an olefin polymer offers further enhancements in shaping processability of the thermoplastic elastomer composition of the present invention. Examples of the olefin polymers having no polar groups include polyethylene, polypropylene, polybutene, and block copolymers and random copolymers of propylene and other α-olefin such as ethylene or 1-butene. These polymers may be used singly, or two or more may be used in combination.

When the additional thermoplastic polymer is added, the content thereof is preferably 100 parts by mass or less, more preferably 50 parts by mass or less, still more preferably 20 parts by mass or less, and further preferably 10 parts by mass or less with respect to 100 parts by mass of the hydrogenated block copolymer (II).

Examples of the tackifier resins include rosin resins, terpene phenol resins, terpene resins, aromatic hydrocarbon-modified terpene resins, aliphatic petroleum resins, alicyclic petroleum resins, aromatic petroleum resins, coumarone-indene resins, phenolic resins and xylene resins.

From the point of view of shaping processability, the softening point of the tackifier resin is preferably 85 to 160° C., more preferably 100 to 150° C., and still more preferably 105 to 145° C.

When the tackifier resin is added, the content thereof is preferably not detrimental to mechanical characteristics of the thermoplastic elastomer composition, and is preferably 100 parts by mass or less, more preferably 70 parts by mass or less, still more preferably 30 parts by mass or less, and particularly preferably 10 parts by mass or less with respect to 100 parts by mass of the hydrogenated block copolymer (II).

The thermoplastic elastomer composition of the present invention may be produced by any method without limitation as long as the method is capable of uniformly mixing the acrylic block copolymer (I), the hydrogenated block copolymer (II) and, where necessary, the polar group-containing polymer (III), the softener (IV), the inorganic filler (V), the oxidation inhibitor (VI), the hydrogenated block copolymer (II') and any other components. A melt-kneading method is preferably used. For example, the melt-kneading may be performed with a melt-kneading device such as a single-screw extruder, a twin-screw extruder, a kneader, a batch mixer, a roller or a Banbury mixer. The thermoplastic elastomer composition of the present invention may be preferably obtained by melt-kneading at 170 to 270° C.

The thermoplastic elastomer composition of the present invention may be adjusted to a wide range of hardness as measured by the Type A durometer method according to JIS K6253-3: 2012 (hereinafter, this hardness is also written as the "A hardness"). The A hardness is preferably 10 to 90, more preferably 12 to 87 or less, and still more preferably 15 to 85. If the A hardness is excessively high, it is difficult to obtain good elasticity and mechanical characteristics. If the A hardness is excessively low, the shaping processability tends to be lowered. The above range of hardness ensures that the thermoplastic elastomer composition attains excellent elasticity, mechanical properties and shaping processability, and is suitably used to establish a high bond strength with respect to, for example, synthetic resins, in particular, resins containing inorganic fillers such as glass fibers, ceramics and metals.

The thermoplastic elastomer composition of the present invention may be widely applied as various shaped articles. Configurations such as shapes, structures and use applications of the shaped articles are not particularly limited. The thermoplastic elastomer composition of the present invention is excellent in flexibility, tensile characteristics, shaping processability, heat resistance and weather resistance, and exhibits a high bond strength even with respect to highly polar materials. Thus, the thermoplastic elastomer composition of the present invention may be used in a laminate structure that includes a layer formed of the thermoplastic elastomer composition of the present invention, and a layer formed of a further material other than the thermoplastic elastomer composition.

[Laminate Structures]

A laminate structure of the present invention includes a layer formed of the thermoplastic elastomer composition of the present invention, and a layer formed of a further material other than the thermoplastic elastomer composition. The laminate structure of the present invention may be a laminate structure that combines, through adhesion, a layer formed of the thermoplastic elastomer composition, and two or more layers formed of a further material other than the thermoplastic elastomer composition.

The shape of the laminate structure is not particularly limited and may be, for example, a film-like shape, a sheet-like shape or a tube-like shape. In particular, the laminate structure preferably has a film-like shape.

Examples of the further materials other than the thermoplastic elastomer composition that are used as adherends include synthetic resins, ceramics, metals and fabrics.

Highly polar synthetic resins may be used in the laminate structures of the present invention. Examples thereof include polyurethane resins, polyamide resins, polyester resins, polycarbonate resins, polyphenylene sulfide resins, polyacrylate resins, polymethacrylate resins such as polymethyl methacrylate resin, polyether resins, (meth)acrylonitrile-butadiene-styrene resins, (meth)acrylonitrile-styrene resins, (meth)acrylic acid ester-butadiene-styrene resins, (meth) acrylic acid ester-styrene resins, methyl (meth)acrylate-butadiene-styrene resins, epoxy resins, phenol resins, diallyl phthalate resins, polyimide resins, melamine resins, polyacetal resins, polysulfone resins, polyethersulfone resins, polyetherimide resins, polyphenylene ether resins, polyarylate resins, polyether ether ketone resins, polystyrene resins, rubber-reinforced polystyrene resins, syndiotactic polystyrene resins, ethylene-vinyl acetate copolymers and ethylene-acrylic acid copolymers. The synthetic resins may be used singly, or two or more may be used in combination. Among those synthetic resins described above, polycarbonate resins, polymethacrylate resins and (meth)acrylonitrile-butadiene-styrene resins are preferable.

In the present specification, the term "(meth)acrylonitrile" means "acrylonitrile or methacrylonitrile".

Other synthetic resins may be suitably used. Examples thereof include polyethylene, polypropylene, polybutene-1, polyhexene-1, poly-3-methyl-butene-1, poly-4-methyl-pentene-1, copolymers of ethylene and one, or two or more C3-C20 α-olefins (such as, for example, propylene, 1-butene, 1-pentene, 1-hexene, 1-heptene, 1-octene, 1-decene, 3-methyl-1-butene, 4-methyl-1-pentene, 6-methyl-1-heptene, isooctene, isooctadiene and decadiene), and ethylene-propylene-diene copolymers (EPDM).

Where necessary, additives may be further added to the layer formed of a synthetic resin while still achieving the object of the present invention. Examples of the additives include heat stabilizers, light stabilizers, UV absorbers, oxidation inhibitors, lubricants, colorants, antistatic agents, flame retardants, water repellents, waterproofing agents, hydrophilicity-imparting agents, conductivity-imparting agents, thermal conductivity-imparting agents, electromagnetic wave shielding agents, translucency-adjusting agents, fluorescent agents, slidability-imparting agents, transparency-imparting agents, antiblocking agents, metal inactivating agents and antibacterial agents.

The ceramics used in the laminate structures of the present invention are non-metallic inorganic materials such as metal oxides, metal carbides and metal nitrides. Examples include glass, cements, alumina, zirconia, zinc oxide ceramics, barium titanate, lead zirconate titanate, silicon carbide, silicon nitride and ferrites.

Examples of the metals used in the laminate structures of the present invention include iron, copper, aluminum, magnesium, nickel, chromium, zinc, and alloys containing these metals. The layer formed of a metal may be a layer having a plating on the surface, for example, copper plating, nickel plating, chromium plating, tin plating, zinc plating, platinum plating, gold plating or silver plating.

The types of textiles of the fabrics used in the laminate structures of the present invention are not particularly limited, and may be, for example, woven fabrics, knitted fabrics, felts and nonwoven fabrics. The materials of the fabrics may be natural fibers, synthetic fibers, or combinations of natural fibers and synthetic fibers. The natural fibers may be one, or two or more selected from the group consisting of cotton, silk, hemp and wool. The natural fibers, however, are not particularly limited thereto.

The synthetic fibers are preferably at least one selected from polyester fibers, acrylic fibers (polyacrylonitrile), polyurethane fibers, polyamide fibers, polyolefin fibers and vinylon fibers. Examples of the polyamide fibers include nylon 6 and nylon 66. Examples of the polyolefin fibers include polyethylene fibers and polypropylene fibers.

The further material other than the thermoplastic elastomer composition is preferably a synthetic resin or a metal to benefit more from the advantageous effects of the present invention, namely, high bond strength.

The laminate structure of the present invention may be produced by any method without limitation. Preferably, the laminate structure is produced by thermally laminating a layer formed of the thermoplastic elastomer composition of the present invention onto a layer formed of the further material described hereinabove. Examples of the lamination methods include injection insert molding methods, extrusion lamination methods, coextrusion methods, calendering methods, slush molding methods, pressing methods and melt-casting methods.

When, for example, the laminate structure is produced by an injection insert molding method, an adherend (a layer formed of a further material other than the thermoplastic elastomer composition of the present invention) that has been formed with a predetermined shape and size is placed into a mold, and the thermoplastic elastomer composition of the present invention is injected into the mold to form a laminate structure. When the laminate structure is produced by an extrusion lamination method, the thermoplastic elastomer composition of the present invention may be extruded in a molten state from a die that is attached to the extruder and has a predetermined shape, directly onto the surface or the edge of an adherend that has been formed with a predetermined shape and size, thereby forming a laminate structure. When the laminate structure is produced by a coextrusion method, the thermoplastic elastomer composition of the present invention and an additional synthetic resin other than the thermoplastic elastomer composition may be melted concurrently in two extruders and may be extruded to form a laminate structure. The laminate structure may be produced by a calendering method in such a manner that the thermoplastic elastomer composition of the present invention is melted and rolled with a heating roll, is held in a molten state through a plurality of rolls, and is thermally bonded to the surface of an adherend that has been formed with a predetermined shape and size, thereby forming a laminate structure. When the laminate structure is produced by a pressing method, the thermoplastic elastomer composition of the present invention is shaped beforehand by an injection molding method or an extrusion method to form a shaped article, and the shaped article is pressed under heating conditions with a device such as a press machine against an adherend that has been formed with a predetermined shape and size, thereby forming a laminate structure. This lamination method is particularly suited when the adherend is a ceramic or a metal.

A preferred thermal lamination method is an injection insert molding method.

The injection molding temperature in the injection insert molding method is not particularly limited. To obtain sufficient adhesion, the cylinder temperature is preferably 150° C. or above, more preferably 200° C. or above, and still more preferably 220° C. or above.

When the adherend is a highly polar synthetic resin or a polyolefin resin, the materials may be melted at the same time and may be coextruded or co-injection molded. Alternatively, one of the materials may be shaped beforehand and be coated with the other material in a molten state or as a solution. Other methods such as two-color molding and insert molding may be adopted.

In the laminate structure of the present invention, the bond strength of the layer formed of the thermoplastic elastomer composition is preferably 20 N/25 mm or more as measured in accordance with JIS K6854-2: 1999. A bond strength of 20 N/25 mm or more is sufficient for practical use. The bond strength is more preferably 30 N/25 mm or more, still more preferably 35 N/25 mm or more, and further preferably 40 N/25 mm or more.

The thermoplastic elastomer composition of the present invention and the laminate structure of the present invention may be used in a wide and varied range of applications. Synthetic resins, synthetic resins containing glass fibers, and light metals such as aluminum and magnesium alloys are used as housing materials for, for example, electronic/electrical devices, OA equipment, home appliances, sporting goods, electric tools and automobile members. For example, the thermoplastic elastomer composition of the present invention may be bonded to these housing materials to form laminate structures. More specifically, the thermoplastic elastomer composition may be suitably bonded to housings of, for example, large displays, laptop computers, mobile phones, PHS, PDA (personal digital assistants such as electronic organizers), electronic dictionaries, video cameras, digital still cameras, portable radio cassette players and inverters to serve as, for example, impact attenuating materials, covering materials having an anti-slip function, waterproof materials, and design materials.

Furthermore, the thermoplastic elastomer composition is useful in a wide range of applications where the thermoplastic elastomer composition is bonded to glass to form a unit or a structure, for example, useful as window moldings and gaskets for automobiles and buildings, glass sealants, and anticorrosive materials. Furthermore, the thermoplastic elastomer composition may be suitably used as sealants at, for example, joints between a glass window of an automobile or a building, and a frame such as an aluminum sash or a metal opening, or at joints between, for example, glass and a metal frame in a solar cell module. Furthermore, the thermoplastic elastomer composition may be suitably used as, for example, separators in secondary batteries used in information terminal devices such as laptop computers, mobile phones and video cameras, and other devices such as hybrid vehicles and fuel cell vehicles.

EXAMPLES

Hereinbelow, the present invention will be described based on Examples. However, it should be construed that the scope of the present invention is not limited to such Examples. β-Farnesene (purity: 97.6 mass %, manufactured by Amyris Incorporated) was used for polymerization described later after being purified with a 3 Å molecular sieve and distilled in a nitrogen atmosphere to remove hydrocarbon impurities such as zingiberene, bisabolene, farnesene epoxide, farnesol isomers, E,E-farnesol, squalene, ergosterol and several farnesene dimers.

The following components were used in Examples and Comparative Examples.

<Acrylic Block Copolymers (I)>

Acrylic block copolymers (I-1) to (I-4) from Production Examples 1 to 4 described later.

<Hydrogenated Block Copolymers (II)>

Hydrogenated block copolymers (II-1) to (II-3) and (II'-1) from Production Examples 5 to 8 described later.

<Polar Group-Containing Polymers (III)>

Polar group-containing polymer (III-1): Polar group-containing polymer from Production Example 9 described later.

Polar group-containing polymer (III-2): Maleic acid-modified polypropylene (trade name: "ADMER QF551" manufactured by Mitsui Chemicals, Inc.).

Polar group-containing polymer (III-3): Ethylene-methyl acrylate copolymer (trade name: "ELVALOY AC12024S" manufactured by DOW-MITSUI POLYCHEMICALS CO., LTD.).

Polar group-containing polymer (III-4): Ethylene-methyl methacrylate copolymer (trade name: "ACRYFT WH401-F" manufactured by Sumitomo Chemical Co., Ltd.).

Polar group-containing polymer (III-5): "PELESTAT 300" manufactured by Sanyo Chemical Industries, Ltd., type: block copolymer obtained by esterifying a modified polyolefin from the reaction of polypropylene-based polyolefin with maleic anhydride, with a polyalkylene glycol based on polyethylene glycol in the presence of a catalyst.

<Softener (IV)>

Hydrogenated paraffin oil ("Diana Process Oil PW-90" manufactured by Idemitsu Kosan Co., Ltd.).

In Production Examples, properties were measured by the methods described in detail below.

(1) Measurement of Molecular Weights Such as Peak-Top Molecular Weight (Mp) and Molecular Weight Distribution (Mw/Mn)

The peak-top molecular weight (Mp) and the molecular weight distribution (Mw/Mn) of the acrylic block copolymer (I) were determined by GPC (gel permeation chromatography) relative to standard polystyrene. The measuring device and the conditions were as follows.

Device: GPC device "GPC 8020" manufactured by TOSOH CORPORATION

Separation columns: "TSKgel GMHXL", "G4000HXL" and "G5000HXL" manufactured by TOSOH CORPORATION were connected in series.

Detector: "RI-8020" manufactured by TOSOH CORPORATION

Eluent: Tetrahydrofuran

Eluent flow rate: 1.0 ml/min

Sample concentration: 5 mg/10 ml

Column temperature: 40° C.

The peak-top molecular weight (Mp) and the molecular weight distribution (Mw/Mn) of the hydrogenated block copolymer (II) were determined by GPC (gel permeation chromatography) relative to standard polystyrene. The measuring device and the conditions were as follows.

Device: GPC device "GPC 8020" manufactured by TOSOH CORPORATION

Separation column: "TSKgel G4000HXL" manufactured by TOSOH CORPORATION

Detector: "RI-8020" manufactured by TOSOH CORPORATION

Eluent: Tetrahydrofuran

Eluent flow rate: 1.0 ml/min

Sample concentration: 5 mg/10 ml

Column temperature: 40° C.

(2) Measurement of Contents of Respective Polymer Blocks in Block Copolymers

In Examples described later, the contents of respective polymer blocks in the acrylic block copolymer (I) were determined by 1H-NMR measurement. The measuring device and the conditions used in the 1H-NMR measurement were as follows.

Device: Nuclear magnetic resonance device "JNM-ECX400" manufactured by JEOL Ltd.
Deuterated solvent: Deuterated chloroform In the 1H-NMR spectrum, the signals near 3.6 ppm and 3.7 ppm were assigned to the ester group of methyl methacrylate unit (—O—CH$_3$) and the ester group of methyl acrylate unit (—O—CH$_3$), respectively, and the signal near 4.0 ppm was assigned to the ester group of n-butyl acrylate unit (—O—CH$_2$—CH$_2$—CH$_2$—CH$_3$) or the ester group of 2-ethylhexyl acrylate unit (—O—CH$_2$—CH(—CH$_2$—CH$_3$)—CH$_2$—CH$_2$—CH$_2$—CH$_3$). The molar ratio of the monomer units was determined from the ratio of the integrals of these signals and was converted to a mass ratio based on the molecular weights of the monomer units. The contents of the respective polymer blocks were thus determined.

(3) Method for Measuring Hydrogenation Ratio

In Examples and Comparative Examples, the block copolymer (P) or (P'), and the hydrogenated block copolymer (II) or (II') after hydrogenation were each dissolved into deuterated chloroform solvent, and analyzed by 1H-NMR at 50° C. using "Lambda-500" manufactured by JEOL Ltd. The hydrogenation ratio of carbon-carbon double bonds in the polymer block (B1) and the polymer block (C1) in the hydrogenated block copolymer (II) or (II') was calculated from the equation below based on the peak of protons in carbon-carbon double bonds that appeared at 4.5-6.0 ppm in the spectrum obtained.

Hydrogenation ratio (mol %)={1−(number of moles of carbon-carbon double bonds per mole of the hydrogenated block copolymer (II) or (II'))/(number of moles of carbon-carbon double bonds per mole of the block copolymer (P) or (P'))}×100

Acrylic Block Copolymers (I)

Production Example 1

(1) While performing stirring at room temperature, a pressure-resistant vessel that had been purged with nitrogen and dried was loaded with 50.0 kg of toluene and 0.0998 kg of 1,2-dimethoxyethane. Subsequently, there was added 0.820 kg of a toluene solution containing 412 mmol of isobutylbis(2,6-di-t-butyl-4-methylphenoxy)aluminum. Further, 0.121 kg of a sec-butyllithium in cyclohexane solution containing 206 mmol of sec-butyllithium was added.

(2) Subsequently, 1.47 kg of methyl methacrylate was added at room temperature while performing stirring, and the mixture was stirred continuously for another 60 minutes. The reaction solution was yellow at first but became colorless after the 60 minutes of stirring.

(3) Subsequently, the internal temperature of the polymerization solution was lowered to −30° C., and 6.33 kg of n-butyl acrylate was added dropwise over a period of 4 hours while performing stirring. After the completion of the dropwise addition, stirring was continued at −30° C. for another 5 minutes.

(4) Subsequently, 1.20 kg of methyl methacrylate was added, and the mixture was stirred at room temperature overnight.

(5) The polymerization reaction was terminated by the addition of 0.370 kg of methanol. The reaction solution obtained was poured into methanol while performing stirring to precipitate a white deposit. The white deposit obtained was recovered and was dried to give an acrylic block copolymer (I-1). The acrylic block copolymer (I-1) obtained was analyzed by the GPC measurement to determine the peak-top molecular weight (Mp) and the molecular weight distribution (Mw/Mn). Furthermore, the total content (E1) of PMMA (the polymer blocks composed of 100 mass % of methyl methacrylate units), and the content of the polymer block (D1) in the acrylic block copolymer (I-1) were determined by the 1H-NMR measurement, thereby calculating (E1)/(D1). The results are described in Table 1.

Production Examples 2 to 4

Acrylic block copolymers (I-2) to (I-4) were produced in the same manner as in Production Example 1, except that the amounts of toluene, 1,2-dimethoxyethane, isobutylbis(2,6-di-t-butyl-4-methylphenoxy)aluminum, and the sec-butyllithium in cyclohexane solution added in the step (1), the amounts of the monomer added in the steps (2) and (4), and the type and the amount of the monomer added in the step (3) were changed as described in Table 1. The acrylic block copolymers (I-2) to (I-4) were analyzed by the measurements described hereinabove. The results are described in Table 1.

TABLE 1

|  |  | Prod. Ex. 1 I-1 | Prod. Ex. 2 I-2 | Prod. Ex. 3 I-3 | Prod. Ex. 4 I-4 |
| --- | --- | --- | --- | --- | --- |
| Amounts [kg] | Toluene | 50.0 | 46.5 | 50.6 | 50.0 |
|  | 1,2-Dimethoxyethane | 0.0998 | 0.123 | 0.0335 | 0.0907 |
|  | isobutylbis(2,6-di-t-butyl-4-methylphenoxy)aluminum | 0.82 | 1.23 | 0.298 | 0.746 |
|  | sec-Butyllithium | 0.121 | 0.149 | 0.0407 | 0.110 |
|  | MMA | 1.47 | 1.8 | 0.462 | 0.886 |
|  | nBA | 6.33 | 6.06 | 8.04 | 3.57 |
|  | 2EHA | — | — | — | 3.57 |
|  | MMA | 1.20 | 4.14 | 0.497 | 0.968 |
| (E1)/(D1)[mass ratio] (*1) |  | 30/70 | 50/50 | 11/89 | 20/80 |
| (d-1)/(D1)[mass %] (*2) |  | 100 | 100 | 100 | 50 |
| Structure of block copolymer (*3) |  | MMA-nBA-MMA | MMA-nBA-MMA | MMA-nBA-MMA | MMA-(nBA/2EHA)-MMA |

TABLE 1-continued

|  | Prod. Ex. 1 I-1 | Prod. Ex. 2 I-2 | Prod. Ex. 3 I-3 | Prod. Ex. 4 I-4 |
|---|---|---|---|---|
| Peak-top molecular weight (Mp) | 66,000 | 68,000 | 217,000 | 73,000 |
| Molecular weight distribution (Mw/Mn) | 1.17 | 1.13 | 1.25 | 1.25 |

The notations in Table 1 indicate the following.
MMA: Methyl methacrylate
nBA: n-Butyl acrylate
2EHA: 2-Ethylhexyl acrylate
(*1): (E1)/(D1) is the mass ratio of the content of the polymer blocks (E1) to the content of the polymer block (D1).
(*2): (d-1)/(D1) is the content of structural units derived from an acrylic acid ester (d-1) having a C4-C6 organic group, in the polymer block (D1).
(*3): MMA-nBA-MMA indicates a triblock copolymer including methyl methacrylate polymer block-n-butyl acrylate polymer block-methyl methacrylate polymer block. MMA-(nBA/2EHA)-MMA indicates a triblock copolymer including methyl methacrylate polymer block-(n-butyl acrylate/2-ethylhexyl acrylate) copolymer block-methyl methacrylate polymer block.

Hydrogenated Block Copolymers (II)

Production Example 5

A pressure-resistant vessel that had been purged with nitrogen and dried was loaded with 50.0 kg of cyclohexane as a solvent and 41.3 g of sec-butyllithium (10.5 mass % cyclohexane solution) as an anionic polymerization initiator. The temperature was raised to 50° C. Thereafter, 1.12 kg of styrene (1) was added and was polymerized for 1 hour. Subsequently, 10.3 kg of β-farnesene was added and was polymerized for 2 hours. Further, 1.12 kg of styrene (2) was added and was polymerized for 1 hour. A reaction solution was thus obtained that contained a triblock copolymer including styrene polymer block-(β-farnesene) polymer block-styrene polymer block. To this reaction solution, palladium carbon (amount of palladium supported: 5 mass %) as a hydrogenation catalyst was added in an amount of 5 mass % relative to the block copolymer, and the reaction was performed at a hydrogen pressure of 2 MPa and 150° C. for 10 hours. After the system was allowed to cool and the pressure was released, the palladium carbon was removed by filtration. The filtrate was concentrated and was further vacuum dried to give a hydrogenated product of the triblock copolymer including styrene polymer block-(β-farnesene) polymer block-styrene polymer block (hereinafter, the hydrogenated product will be written as the hydrogenated block copolymer (II-1)). The hydrogenated block copolymer (II-1) was analyzed by the measurements described hereinabove. The results are described in Table 2.

Production Example 6

A hydrogenated block copolymer (II-2) was produced in the same manner as in Production Example 5, except that the formulation was changed as described in Table 2. The hydrogenated block copolymer (II-2) obtained was analyzed by the measurements described hereinabove. The results are described in Table 2.

Production Example 7

A pressure-resistant vessel that had been purged with nitrogen and dried was loaded with 50.0 kg of cyclohexane as a solvent, 0.191 kg of sec-butyllithium (10.5 mass % cyclohexane solution) as an anionic polymerization initiator, and 0.40 kg of tetrahydrofuran as a Lewis base. The temperature was raised to 50° C. Thereafter, 6.34 kg of β-farnesene was added and was polymerized for 2 hours. Subsequently, 2.50 kg of styrene (1) was added and was polymerized for 1 hour. Further, 3.66 kg of butadiene was added and was polymerized for 1 hour. Subsequently, 0.02 kg of dichlorodimethylsilane as a coupling agent was added to the polymerization reaction solution, and the reaction was performed for 1 hour. A reaction solution was thus obtained that included a pentablock copolymer (P) including β-farnesene) polymer block-styrene polymer block-butadiene polymer block-styrene polymer block-(β-farnesene) polymer block. To this reaction solution, palladium carbon (amount of palladium supported: 5 mass %) as a hydrogenation catalyst was added in an amount of 5 mass % relative to the block copolymer (P), and the reaction was performed at a hydrogen pressure of 2 MPa and 150° C. for 10 hours. After the system was allowed to cool and the pressure was released, the palladium carbon was removed by filtration. The filtrate was concentrated and was further vacuum dried to give a hydrogenated product (II-3) of the pentablock copolymer including (β-farnesene) polymer block-styrene polymer block-butadiene polymer block-styrene polymer block-(β-farnesene) polymer block (hereinafter, the hydrogenated product will be written as the hydrogenated block copolymer (II-3)). The hydrogenated block copolymer (II-3) obtained was analyzed by the measurements described hereinabove. The results are described in Table 2.

Production Example 8

A hydrogenated block copolymer (II'-1) was produced in the same manner as in Production Example 5, except that isoprene was used in place of β-farnesene according to the formulation described in Table 2. The hydrogenated block copolymer (II'-1) obtained was analyzed by the measurements described hereinabove. The results are described in Table 2.

TABLE 2

|  |  | Prod. Ex. 5 II-1 | Prod. Ex. 6 II-2 | Prod. Ex. 7 II-3 | Prod. Ex. 8 II'-1 |
|---|---|---|---|---|---|
| Amounts [kg] | Cyclohexane | 50 | 50 | 50 | 50 |
|  | sec-Butyllithium | 0.0413 | 0.0155 | 0.191 | 0.0239 |
|  | Tetrahydrofuran | — | — | 0.4 | — |

TABLE 2-continued

|  | Prod. Ex. 5 II-1 | Prod. Ex. 6 II-2 | Prod. Ex. 7 II-3 | Prod. Ex. 8 II'-1 |
|---|---|---|---|---|
| Styrene (1) | 1.12 | 1.32 | 2.5 | 1.57 |
| Styrene (2) | 1.12 | 1.32 | — | 1.57 |
| β-Farnesene | 10.3 | 6.18 | 6.34 | — |
| Butadiene | — | — | 3.66 | — |
| Isoprene | — | — | — | 6.38 |
| Dichlorodimethylsilane | — | — | 0.02 | — |
| (A1)/(B1) [mass ratio] (*4) | 18/82 | 30/70 | 28/72 | 33/67 |
| (A1)/((B1) + (C1)) [mass ratio] (*5) | — | — | 20/80 | — |
| (b1)/(B1) [mass %] (*6) | 100 | 100 | 100 | 0 |
| ((b1) + (c1))/((B1) + (C1)) [mass ratio] (*7) | — | — | 63.4 | — |
| Structure of block copolymer (*8) | St-F-St | St-F-St | F-St-Bd-St-F | St-Ip-St |
| Peak-top molecular weight (Mp) | 201,000 | 373,000 | 102,000 | 328,000 |
| Molecular weight distribution (Mw/Mn) | 1.23 | 1.40 | 1.50 | 1.07 |
| Hydrogenation ratio [mol %] (*9) | 92.8 | 87.6 | 93.0 | 90.2 |

The notations in Table 2 indicate the following.
(*4): (A1)/(B1) is the mass ratio of the content of the polymer blocks (A1) to the content of the polymer block (B1).
(*5): (A1)/((B1) + (C1)) is the mass ratio of the content of the polymer blocks (A1) to the total of the contents of the polymer block (B1) and of the polymer block (C1). This mass ratio was calculated only when the polymer block (C1) was present.
(*6): (b1)/(B1) indicates the proportion (%) of the content of structural units (b1) derived from farnesene in the polymer block (B1).
(*7): ((b1) + (c1))/((B1) + (C1)) is the ratio of the total content of structural units (b1) and structural units (c1) derived from farnesene to the total of the polymer block (B1) and the polymer block (C1). This ratio was calculated only when the polymer block (C1) was present.
(*8): St-F-St indicates a triblock copolymer including styrene polymer block-(β-farnesene) polymer block-styrene polymer block. F-St-Bd-St-F indicates a pentablock copolymer including (β-farnesene) polymer block-styrene polymer block-butadiene polymer block-styrene polymer block-(β-farnesene) polymer block. St-Ip-St indicates a triblock copolymer including styrene polymer block-isoprene polymer block-styrene polymer block.
(*9): The hydrogenation ratio indicates the ratio of carbon-carbon double bonds in the polymer block (B1) that were hydrogenated. When the polymer block (C1) was present, the hydrogenation ratio indicates the ratio of carbon-carbon double bonds in the polymer block (B1) and the polymer block (C1) that were hydrogenated.

Polar Group-Containing Polymer (III)

Production Example 9

A dry blend was obtained by mixing 100 parts by mass of a hydrogenated product (SEEPS-OH) of a triblock copolymer that included styrene polymer block-(isoprene/butadiene) copolymer block-styrene polymer block and had a hydroxyl group at one terminal of the molecule (number average molecular weight: 65,000, content of styrene-derived structural units: 29 mass %, hydrogenation ratio in (isoprene/butadiene) copolymer block=98%, glass transition temperature=−58° C., average number of hydroxyl groups=0.9/molecule) and 100 parts by mass of a thermoplastic polyurethane ["KURAMIRON" 1180 (trade name) manufactured by KURARAY CO., LTD.; polyester-based polyurethane elastomer having polybutylene adipate as a soft segment]. The dry blend was melt-kneaded with a twin-screw extruder ("ZSK26Mc" manufactured by Coperion; number of cylinders: 14) at a cylinder temperature of 230° C. and a screw rotational speed of 200 rpm. The kneaded mixture was extruded into a strand and was cut to give pellets. The unreacted polyurethane was extracted using dimethylformamide and was removed from the pellets. Next, the unreacted SEEPS-OH was extracted using cyclohexane and was removed. The residual solid was dried to give a polar group-containing polymer (III-1) that was a polyurethane-based block copolymer formed by bonding of the triblock copolymer (SEEPS) and the thermoplastic polyurethane ("KURAMIRON 1180").

Examples 1 to 18 and Comparative Examples 1 to 6

Preparation of Thermoplastic Elastomer Compositions

The components described in Table 3 or Table 4 were preliminarily mixed with the proportions described in Table 3 or Table 4 to give a composition, which was then melt-kneaded in a twin-screw extruder ("ZSK26Mc" manufactured by Coperion; number of cylinders: 14) at 230° C. and a screw rotational speed of 200 rpm. Thermoplastic elastomer compositions were thus obtained. The thermoplastic elastomer compositions obtained were tested by the following methods to measure properties. The results are described in Table 3 and Table 4.

<Production of Laminate Structures>

Laminate structures were produced by an injection insert molding method while using adherends described later (100 mm in length×35 mm in width×1 mm in thickness) as inserts. Each insert was fixed in the mold with a vacuum line. The thermoplastic elastomer composition was injected into the mold at a mold temperature of 40° C. and a cylinder temperature of 230° C., and the surface temperature of the adherend was lowered to 40° C. A laminate structure was thus obtained. The layer of the thermoplastic elastomer composition was peeled from the laminate structure to measure the peel strength.

The adherends used for the production of laminate structures are described in detail below.

Polycarbonate (PC) plate: Trade name "Iupilon (registered trademark) S-3000R" manufactured by Mitsubishi Engineering-Plastics Corporation Acrylonitrile-butadiene-styrene resin (ABS) plate: Trade name "Toyolac (registered trademark) 700-314" manufactured by TORAY INDUSTRIES, INC.

Polymethyl methacrylate resin (PMMA) plate: Trade name "PLEXIGLAS (registered trademark) 6N" manufactured by Daicel Evonik (1) Hardness (1-1) Preparation of Sheets of Thermoplastic Elastomer Compositions The thermoplastic elastomer compositions obtained in Examples and Comparative Examples were each injection molded with use of an injection molding machine ("EC75SX; 75 tons" manufactured by TOSHIBA MACHINE CO., LTD.) at a cylinder temperature of 230° C. and a mold temperature of 40° C. to form a sheet having a length of 100 mm, a width of 35 mm and a thickness of 2 mm.

(1-2) Measurement of Hardness

The sheets of the thermoplastic elastomer compositions obtained above were each punched with a punching blade conforming to JIS K6251: 2010 to give dumbbell Type-3 specimens.

Three of the specimens obtained were stacked on top of one another to a thickness of 6 mm, and tested with a Type-A durometer indenter in accordance with JIS K6253-3: 2012 to measure the hardness.

(2) Measurement of Tensile Strength at Break and Tensile Strain at Break

The dumbbell Type-3 specimens obtained above were each tested in accordance with JIS K6251: 2010 to measure the tensile strength at break and the tensile strain at break. Larger values of tensile strength at break and tensile strain at break indicate higher tensile characteristics. The tensile strength at break is preferably 2.0 MPa or more, and more preferably 3.5 MPa or more. The tensile strain at break is preferably 100% or more, and more preferably 150% or more.

(3) Shaping Processability

In the fabrication of sheets by injection molding, the shaping processability was evaluated according to the criteria below. The shaping processability is preferably such that the material remains on the cavity side in less than half of the shots, and is more preferably such that the material does not remain at all.

A: The material did not remain on the cavity side in 10 continuous shots.

B: The material remained on the cavity side in 1 to less than 5 shots out of 10 continuous shots.

C: The material remained on the cavity side in 5 or more shots out of 10 continuous shots.

(4) Peel Strength

The laminate structures produced above were each tested with "Instron 5566" manufactured by Instron in accordance with JIS K6854-2: 1999 at a peeling angle of 180° and a stress rate of 50 mm/min to determine the peel bond strength of the layer of the thermoplastic elastomer composition in the laminate structure. The peel strength was measured 4 times, and the results were averaged. The larger the value of peel strength, the higher the bond strength to the adherend.

Furthermore, the laminate structures after the peel bond strength test were visually observed to determine whether the fracture mode was cohesive failure or interfacial peeling. The peel strength was rated as A when the fracture mode was cohesive failure and was rated as B when the fracture mode was interfacial peeling.

TABLE 3

|  |  | Ex. 1 | Ex. 2 | Ex. 3 | Ex. 4 | Ex. 5 |
| --- | --- | --- | --- | --- | --- | --- |
| Acrylic block copolymer (I) | (I-1) | 100 | 100 | 100 | 250 | 250 |
|  | (I-2) |  |  |  |  |  |
|  | (I-3) |  |  |  |  |  |
|  | (I-4) |  |  |  |  |  |
| Hydrogenated block copolymer (II) | (II-1) | 100 |  |  |  |  |
|  | (II-2) |  | 100 |  | 100 |  |
|  | (II-3) |  |  | 100 |  | 100 |
|  | (II'-1) |  |  |  |  |  |
| Polar group-containing polymer (III) | (III-1) |  |  |  |  |  |
|  | (III-2) |  |  |  |  |  |
|  | (III-3) |  |  |  |  |  |
|  | (III-4) |  |  |  |  |  |
|  | (III-5) |  |  |  |  |  |
| Softener (IV) | (IV-1) |  |  |  |  |  |
| Hardness (Type A) |  | 43 | 49 | 49 | 54 | 55 |
| Tensile strength at break (MPa) |  | 5.0 | 7.0 | 6.0 | 7.2 | 7.9 |
| Tensile strain at break (%) |  | 570 | 530 | 620 | 530 | 530 |
| Shaping processability |  | B | A | B | B | B |
| PC | Peel strength (N/25 mm) | 31 | 65 | 37 | 40 | 33 |
|  | Fracture mode | A | A | A | A | A |
| ABS | Peel strength (N/25 mm) | 33 | 45 | 35 | 36 | 31 |
|  | Fracture mode | A | A | A | A | A |
| PMMA | Peel strength (N/25 mm) | 46 | 56 | 32 | 41 | 46 |
|  | Fracture mode | A | A | A | A | A |

TABLE 3-continued

|  |  | Ex. 6 | Ex. 7 | Ex. 8 | Ex. 9 |
|---|---|---|---|---|---|
| Acrylic block copolymer (I) | (I-1) | 200 | 50 |  |  |
|  | (I-2) |  | 50 | 100 | 100 |
|  | (I-3) |  |  |  |  |
|  | (I-4) |  |  |  |  |
| Hydrogenated block copolymer (II) | (II-1) |  |  |  |  |
|  | (II-2) |  | 100 | 100 |  |
|  | (II-3) | 100 |  |  | 100 |
|  | (II'-1) |  |  |  |  |
| Polar group-containing polymer (III) | (III-1) | 50 |  |  |  |
|  | (III-2) |  |  |  |  |
|  | (III-3) |  |  |  |  |
|  | (III-4) |  |  |  |  |
|  | (III-5) |  |  |  |  |
| Softener (IV) | (IV-1) |  |  |  |  |
| Hardness (Type A) |  | 55 | 58 | 81 | 51 |
| Tensile strength at break (MPa) |  | 6.6 | 8.6 | 8.6 | 8.1 |
| Tensile strain at break (%) |  | 600 | 290 | 160 | 200 |
| Shaping processability |  | B | A | A | A |
| PC | Peel strength (N/25 mm) | 34 | 40 | 37 | 38 |
|  | Fracture mode | A | A | A | A |
| ABS | Peel strength (N/25 mm) | 31 | 34 | 34 | 40 |
|  | Fracture mode | A | A | A | A |
| PMMA | Peel strength (N/25 mm) | 30 | 29 | 33 | 52 |
|  | Fracture mode | A | A | A | A |

|  |  | Ex. 10 | Ex. 11 | Ex. 12 | Ex. 13 | Ex. 14 |
|---|---|---|---|---|---|---|
| Acrylic block copolymer (I) | (I-1) |  |  |  |  |  |
|  | (I-2) |  |  | 100 | 100 | 100 |
|  | (I-3) | 100 |  |  |  |  |
|  | (I-4) |  | 100 |  |  |  |
| Hydrogenated block copolymer (II) | (II-1) |  |  |  |  |  |
|  | (II-2) | 100 | 100 | 100 | 100 | 100 |
|  | (II-3) |  |  |  |  |  |
|  | (II'-1) |  |  |  |  |  |
| Polar group-containing polymer (III) | (III-1) |  |  |  |  |  |
|  | (III-2) |  |  |  |  |  |
|  | (III-3) |  |  |  |  |  |
|  | (III-4) |  |  |  |  |  |
|  | (III-5) |  |  | 10 | 20 | 20 |
| Softener (IV) | (IV-1) |  |  |  |  | 50 |
| Hardness (Type A) |  | 15 | 18 | 78 | 81 | 69 |
| Tensile strength at break (MPa) |  | 4.4 | 5.0 | 9.5 | 9.4 | 7.0 |
| Tensile strain at break (%) |  | 560 | 400 | 240 | 250 | 200 |
| Shaping processability |  | B | B | A | A | A |
| PC | Peel strength (N/25 mm) | 38 | 51 | 38 | 39 | 36 |
|  | Fracture mode | A | A | A | A | A |
| ABS | Peel strength (N/25 mm) | 37 | 42 | 48 | 54 | 50 |
|  | Fracture mode | A | A | A | A | A |
| PMMA | Peel strength (N/25 mm) | 35 | 48 | 46 | 56 | 55 |
|  | Fracture mode | A | A | A | A | A |

|  |  | Ex. 15 | Ex. 16 | Ex. 17 | Ex. 18 |
|---|---|---|---|---|---|
| Acrylic block copolymer (I) | (I-1) |  |  |  |  |
|  | (I-2) | 100 | 100 | 100 | 100 |
|  | (I-3) |  |  |  |  |
|  | (I-4) |  |  |  |  |

TABLE 3-continued

|  |  |  |  |  |  |
|---|---|---|---|---|---|
| Hydrogenated block copolymer (II) | (II-1) | | | | |
| | (II-2) | 100 | 100 | 100 | 100 |
| | (II-3) | | | | |
| | (II'-1) | | | | |
| Polar group-containing polymer (III) | (III-1) | | | | |
| | (III-2) | 10 | | | |
| | (III-3) | | 10 | 50 | |
| | (III-4) | | | | 10 |
| | (III-5) | | | | |
| Softener (IV) | (IV-1) | | | | |
| Hardness (Type A) | | 80 | 79 | 73 | 78 |
| Tensile strength at break (MPa) | | 11 | 8.5 | 7.1 | 8.4 |
| Tensile strain at break (%) | | 230 | 170 | 200 | 170 |
| Shaping processability | | A | A | A | A |
| PC | Peel strength (N/25 mm) | 24 | 29 | 26 | 27 |
| | Fracture mode | A | A | A | A |
| ABS | Peel strength (N/25 mm) | 36 | 36 | 29 | 32 |
| | Fracture mode | A | A | A | A |
| PMMA | Peel strength (N/25 mm) | 37 | 34 | 29 | 31 |
| | Fracture mode | A | A | A | A |

TABLE 4

|  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Acrylic block copolymer (I) | (I-1) | 100 | | | | | 100 |
| | (I-2) | | 100 | | | 50 | |
| | (I-3) | | | | | | |
| | (I-4) | | | | | | |
| Hydrogenated block copolymer (II) | (II-1) | | | 100 | | | |
| | (II-2) | | | | 100 | 100 | |
| | (II-3) | | | | | | |
| | (II'-1) | | | | | | 100 |
| Polar group-containing polymer (III) | (III-1) | | | | | | |
| | (III-2) | | | | | | |
| | (III-3) | | | | | | |
| | (III-4) | | | | | | |
| | (III-5) | | | | | | |
| Softener (IV) | (IV-1) | | | | | | |
| Hardness (TypeA) | | 59 | 95 | 8 | 21 | 61 | Uniform kneading failed |
| Tensile strength at break (MPa) | | 9.1 | 19 | 4.8 | 4.6 | 7.6 | |
| Tensile strain at break (%) | | 370 | 140 | 820 | 550 | 230 | |
| Shaping processability | | C | A | B | A | A | |
| PC | Peel strength (N/25 mm) | 59 | 13 | <5.0 | <5.0 | 7.5 | |
| | Fracture mode | B | B | B | B | B | |
| ABS | Peel strength (N/25 mm) | 58 | 60 | <5.0 | <5.0 | 18 | |
| | Fracture mode | B | A | B | B | B | |
| PMMA | Peel strength (N/25 mm) | 61 | 30 | <5.0 | <5.0 | 24 | |
| | Fracture mode | B | B | B | B | B | |

The results of Examples are described in Table 3, and the results of Comparative Examples are described in Table 4.

As compared to Comparative Example 3 that did not involve any acrylic block copolymers (I), Example 1 attained good adhesion to the highly polar resins.

As compared to Comparative Example 4 that did not involve any acrylic block copolymers (I), Examples 2, 4, 7, 8, 10 and 11 attained good adhesion to the highly polar resins, Examples 12, 13 and 15 to 18 that further involved the polar group-containing polymer (III) resulted in good adhesion and tensile characteristics, and Example 14 that further involved the softener (IV) achieved good adhesion and tensile characteristics.

Comparative Example 5 in which the content of the acrylic block copolymer (I) was low resulted in practically insufficient bond strength to the highly polar synthetic resins. Comparative Example 6 that involved a hydrogenated block copolymer free from β-farnesene failed to produce a uniform composition because the materials were not sufficiently melted during melt-kneading.

INDUSTRIAL APPLICABILITY

The thermoplastic elastomer composition and the laminate structure obtained in the present invention are useful in that the thermoplastic elastomer composition of the present invention can be adjusted to a wide range of hardness, and has excellent tensile characteristics and shaping processability, and further in that the laminate structure of the present invention has a high peel strength of the layer formed of the thermoplastic elastomer composition.

The invention claimed is:

1. A thermoplastic elastomer composition comprising an acrylic block copolymer (I) and a hydrogenated block copolymer (II), wherein
   the content of the acrylic block copolymer (I) is 70 to 300 parts by mass with respect to 100 parts by mass of the hydrogenated block copolymer (II),
   the hydrogenated block copolymer (II) is a hydrogenated product of a block copolymer (P) including
      at least two polymer blocks (A1) containing structural units derived from an aromatic vinyl compound,
      a polymer block (B1) containing 1 to 100 mass % of structural units (b1) derived from farnesene and 99 to greater than 0 mass % of structural units (b2) derived from a conjugated diene other than farnesene, and
      a polymer block (C1) containing less than 1 mass % of structural units (c1) derived from farnesene, and 1 to 100 mass % of structural units (c2) derived from a conjugated diene other than farnesene, wherein
   the block copolymer (P) includes at least one polymer block (B1) located at a terminal, and the hydrogenation ratio of carbon-carbon double bonds in the polymer block (B1) and the polymer block (C1) is 50 to 100 mol %,
   the mass ratio [(A1)/((B1)+ (C1))] of the polymer blocks (A1) to the total of the polymer block (B1) and the polymer block (C1) is 1/99 to 70/30,
   the mass ratio [(A1)/(B1)] of the polymer block (A1) to the polymer block (B1) is 1/99 to 70/30, and
   the hydrogenation ratio of carbon-carbon double bonds in the polymer block (B1) is 50 to 100 mol %.

2. The thermoplastic elastomer composition according to claim 1, wherein the acrylic block copolymer (I) includes a polymer block (D1) containing structural units derived from an acrylic acid ester, and a polymer block (E1) containing structural units derived from a methacrylic acid ester, and the acrylic block copolymer (I) is a triblock copolymer having blocks in the order of the polymer block (E1), the polymer block (D1) and the polymer block (E1).

3. The thermoplastic elastomer composition according to claim 1, wherein the molecular weight distribution of the acrylic block copolymer (I) is in the range of 1.00 to 1.40.

4. The thermoplastic elastomer composition according to claim 1, further comprising 1 to 200 parts by mass of a softener (IV) with respect to 100 parts by mass of the hydrogenated block copolymer (II).

5. The thermoplastic elastomer composition according to claim 1, wherein the hydrogenation ratio of carbon-carbon double bonds in the polymer block (B1) is 70 to 100 mol %.

6. The thermoplastic elastomer composition according to claim 1, wherein the aromatic vinyl compound is at least one selected from the group consisting of styrene, α-methylstyrene and 4-methylstyrene.

7. The thermoplastic elastomer composition according to claim 1, wherein the farnesene is β-farnesene.

8. The thermoplastic elastomer composition according to claim 1, wherein the conjugated diene other than farnesene is at least one selected from the group consisting of isoprene, butadiene and myrcene.

9. The thermoplastic elastomer composition according to claim 1, wherein the acrylic block copolymer (I) has a peak-top molecular weight (Mp) in the range of 50,000 to 250,000 as measured by gel permeation chromatography relative to standard polystyrene.

10. The thermoplastic elastomer composition according to claim 1, wherein the hydrogenated block copolymer (II) has a peak-top molecular weight (Mp) of 4,000 to 1,500,000 as measured by gel permeation chromatography relative to standard polystyrene.

11. The thermoplastic elastomer composition according to claim 1, wherein the hydrogenated block copolymer (II) is a hydrogenated product of a triblock copolymer having blocks in the order of the polymer block (A1), the polymer block (B1) and the polymer block (A1).

12. The thermoplastic elastomer composition according to claim 1, further comprising 1 to 200 parts by mass of a polar group-containing polymer (III) with respect to 100 parts by mass of the hydrogenated block copolymer (II).

13. The thermoplastic elastomer composition according to claim 12, wherein the polar group-containing polymer (III) is a hydrophilic group-containing block copolymer having a structure in which polyolefin blocks and hydrophilic polymer blocks are bonded to one another alternately.

14. A laminate structure comprising a layer formed of the thermoplastic elastomer composition according to claim 1, and a layer formed of a further material other than the thermoplastic elastomer composition.

15. The laminate structure according to claim 14, wherein the further material is at least one selected from the group consisting of synthetic resins, metals and ceramics.

16. A method for producing a laminate structure, the method comprising thermally laminating a layer formed of the thermoplastic elastomer composition according to claim 1 onto a layer formed of a further material other than the thermoplastic elastomer composition.

* * * * *